US012785237B2

(12) United States Patent
Suzuki et al.

(10) Patent No.: US 12,785,237 B2
(45) **Date of Patent: *Nov. 3, 2026**

(54) DIELECTRIC FILTER WITH COUPLING PATTERNS

(71) Applicant: SOSHIN ELECTRIC CO., LTD., Saku-City (JP)

(72) Inventors: Shun Suzuki, Saku-City (JP); Hiroyuki Isono, Saku-City (JP); Kazuya Adachi, Saku-City (JP); Kazuma Kosaka, Saku-City (JP)

(73) Assignee: SOSHIN ELECTRIC CO., LTD., Saku-City (JP)

( * ) Notice: Subject to any disclaimer, the term of this patent is extended or adjusted under 35 U.S.C. 154(b) by 84 days.

This patent is subject to a terminal disclaimer.

(21) Appl. No.: 18/849,577

(22) PCT Filed: Mar. 14, 2023

(86) PCT No.: PCT/JP2023/009807
§ 371 (c)(1),
(2) Date: Sep. 23, 2024

(87) PCT Pub. No.: WO2023/189530
PCT Pub. Date: Oct. 5, 2023

(65) Prior Publication Data

US 2025/0210839 A1 Jun. 26, 2025

(30) Foreign Application Priority Data

Mar. 28, 2022 (JP) ................................ 2022-051587

(51) Int. Cl.

| | |
|---|---|
| ***H01P 1/203*** | (2006.01) |
| ***H01P 1/20*** | (2006.01) |
| ***H01P 7/10*** | (2006.01) |

(52) U.S. Cl.
CPC ........ *H01P 1/20309* (2013.01); *H01P 1/2002* (2013.01); *H01P 7/10* (2013.01)

(58) Field of Classification Search
CPC ....... H01P 1/20309; H01P 1/2002; H01P 7/10
(Continued)

(56) References Cited

U.S. PATENT DOCUMENTS

2021/0296748 A1 9/2021 Ogawa
2022/0006170 A1 1/2022 Ogawa et al.
(Continued)

FOREIGN PATENT DOCUMENTS

DE 11 2019 005 797 T5 8/2021
DE 11 2020 000 722 T5 11/2021
(Continued)

OTHER PUBLICATIONS

International Search Report and Written Opinion (Application No. PCT/JP2023/009807) dated May 30, 2023 (8 pages).
(Continued)

*Primary Examiner* — Andrea Lindgren Baltzell
*Assistant Examiner* — Victor Cole
(74) *Attorney, Agent, or Firm* — Muncy, Geissler, Olds & Lowe, P.C.

(57) ABSTRACT

A filter is provided with: a plurality of resonators each comprising a via-electrode portion formed in a dielectric substrate, and a capacitor electrode that faces a first shielding conductor and is connected to one end of the via-electrode portion; and a first capacitively coupled structure which includes a first electrode pattern connected to the first capacitor electrode of the first resonator), and a second electrode pattern which is connected to the second capacitor electrode of the second resonator and of which at least a part overlaps at least a part of the first electrode pattern in plan view.

6 Claims, 35 Drawing Sheets

(58) Field of Classification Search
USPC .................................. 333/165, 202, 204, 219
See application file for complete search history.

(56) References Cited

U.S. PATENT DOCUMENTS

2022/0131249 A1* 4/2022 Uemichi .................. H01P 3/12
2022/0131522 A1 4/2022 Ogawa

FOREIGN PATENT DOCUMENTS

JP 2017-195565 A 10/2017
JP 2020-198482 A 12/2020

OTHER PUBLICATIONS

Taiwanese Office Action (Application No. 112111565) dated Apr. 2, 2024 (with English translation) (10 pages).
German Office Action for German Application No. 11 2023 001 611.9 dated Jun. 12, 2026.

* cited by examiner

DIELECTRIC FILTER WITH COUPLING PATTERNS

TECHNICAL FIELD

The present invention relates to a filter.

BACKGROUND ART

A resonator has been proposed having a strip line that faces toward a shielding conductor formed in the vicinity of one main surface of a dielectric substrate, and a via electrode one end of which is connected to a shielding conductor formed in the vicinity of another main surface of the dielectric substrate, and another end of which is connected to the strip line (see, JP 2020-198482 A).

SUMMARY OF THE INVENTION

There is a demand for filters that are lower in height. However, in the case that the height of the filter is simply reduced, this leads to a deterioration in the filter characteristics.

The present invention has the object of solving the aforementioned problem.

A filter according to a first aspect of the present invention includes a dielectric substrate, a first shielding conductor formed in vicinity of a first main surface of the dielectric substrate, a second shielding conductor formed in vicinity of a second main surface of the dielectric substrate, a plurality of resonators each including a via electrode portion formed inside the dielectric substrate and a capacitor electrode facing toward the first shielding conductor and connected to one end of the via electrode portion, and a first capacitive coupling structure including a first electrode pattern connected to a first capacitor electrode which is the capacitor electrode provided in a first resonator from among the plurality of resonators, and a second electrode pattern connected to a second capacitor electrode which is the capacitor electrode provided in a second resonator from among the plurality of resonators, at least a portion of the second electrode pattern overlapping with at least a portion of the first electrode pattern as viewed in plan.

A filter according to another aspect of the present invention includes a dielectric substrate, a first shielding conductor formed in vicinity of a first main surface of the dielectric substrate, a second shielding conductor formed in vicinity of a second main surface of the dielectric substrate, a plurality of resonators each including a via electrode portion formed inside the dielectric substrate and a capacitor electrode facing toward the first shielding conductor and connected to one end of the via electrode portion, and a capacitive coupling structure including a first electrode pattern connected to a first via electrode portion which is the via electrode portion provided in a first resonator from among the plurality of resonators, and a second electrode pattern connected to a second via electrode portion which is the via electrode portion provided in a second resonator from among the plurality of resonators, at least a portion of the second electrode pattern overlapping at least a portion of the first electrode pattern as viewed in plan, wherein a longitudinal direction of the via electrode portion is aligned along a first direction that is a normal direction of the first shielding conductor, a position of the capacitor electrode in the first direction is between a position of the first shielding conductor in the first direction and a position of the capacitive coupling structure in the first direction, and a first distance, which is a distance between the capacitor electrode and the capacitive coupling structure in the first direction, is less than or equal to twice a second distance, which is a distance between the first shielding conductor and the capacitor electrode in the first direction.

According to the present invention, it is possible to provide a filter that can achieve a reduction in height while suppressing deterioration of the filter characteristics.

DETAILED DESCRIPTION OF THE INVENTION

First Embodiment

Figure 1:
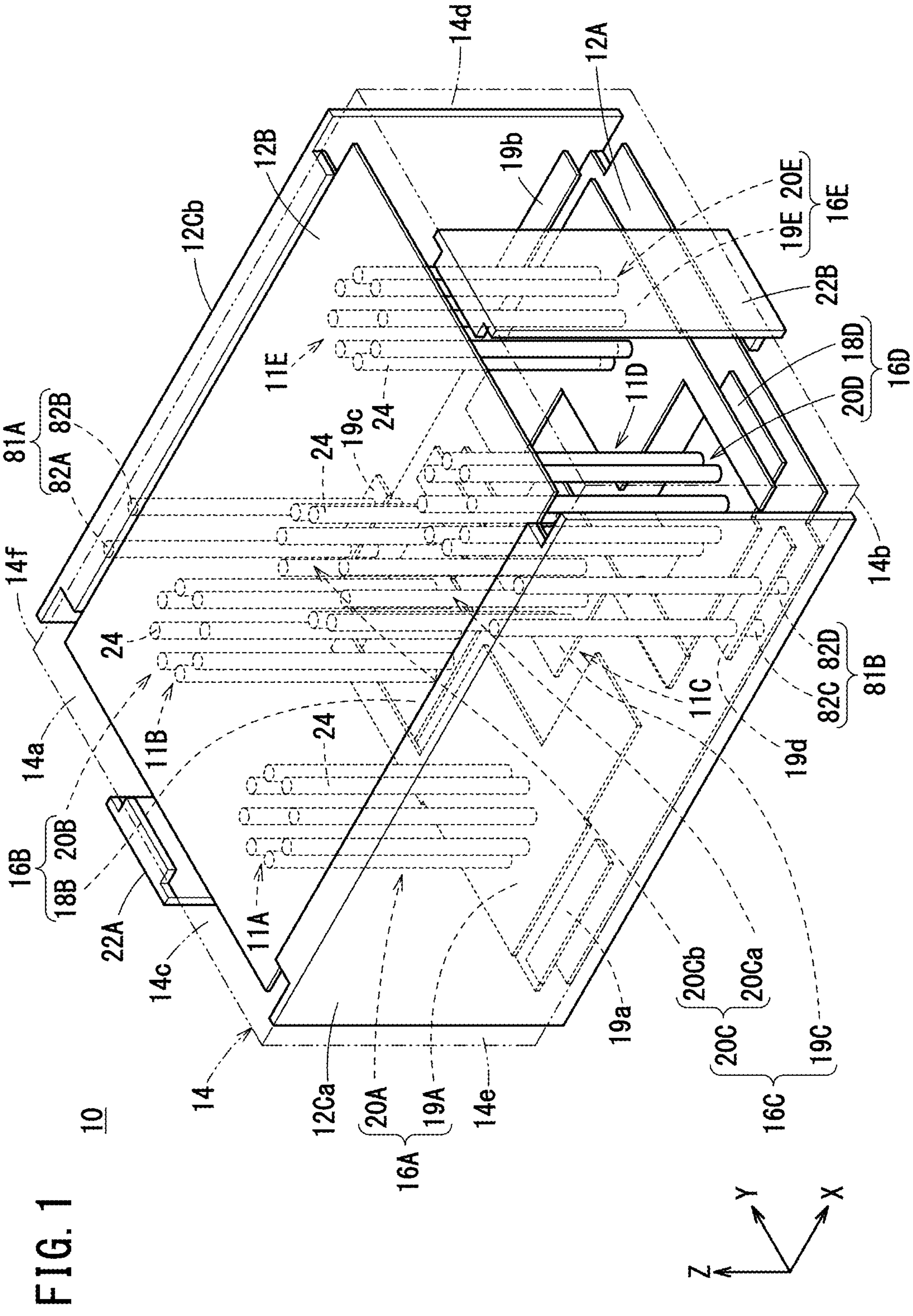
FIG. 1 is a perspective view showing a filter according to a first embodiment.
Figure 2:
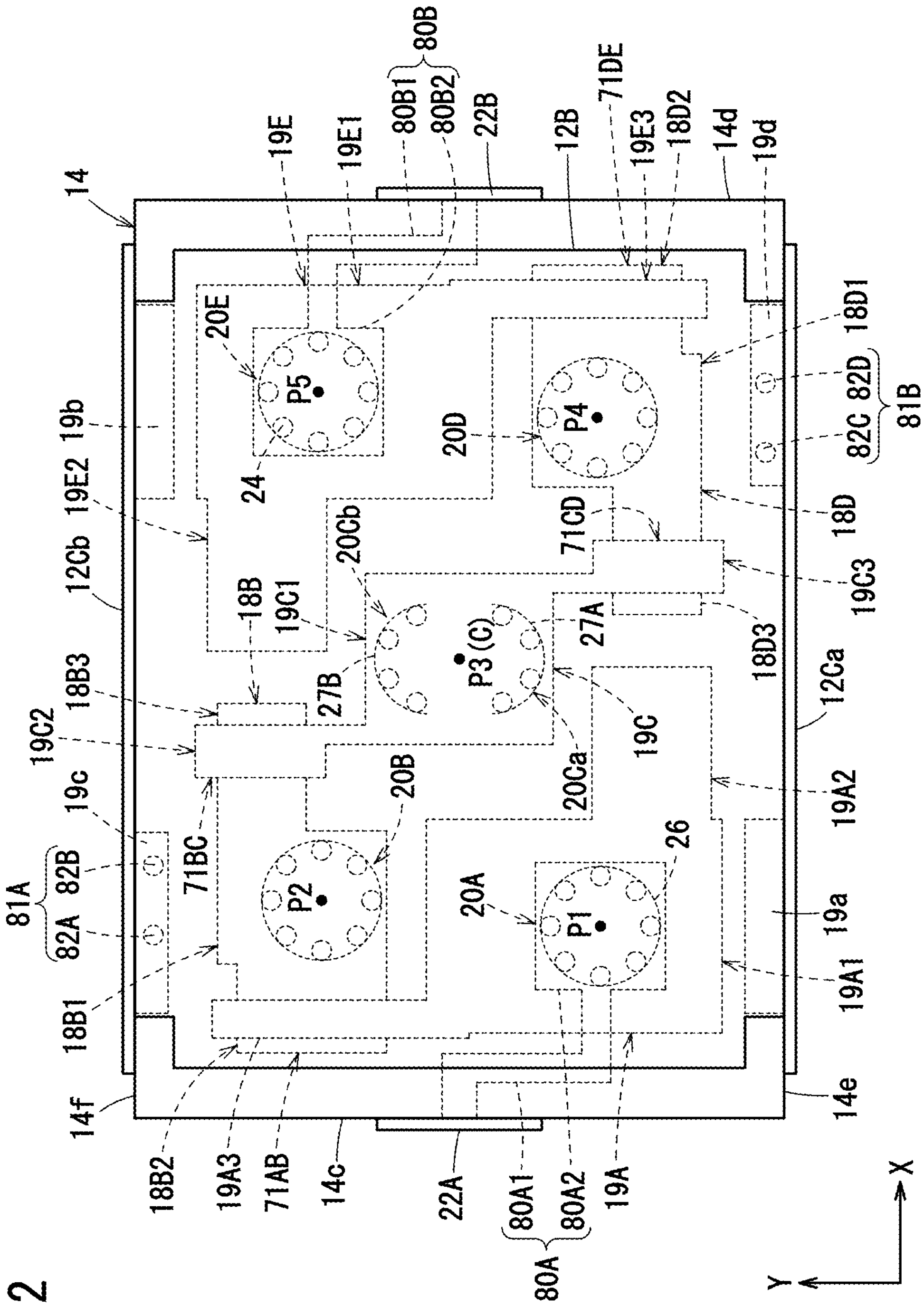
FIG. 2 is a plan view showing the filter according to the first embodiment.
Figure 3A:
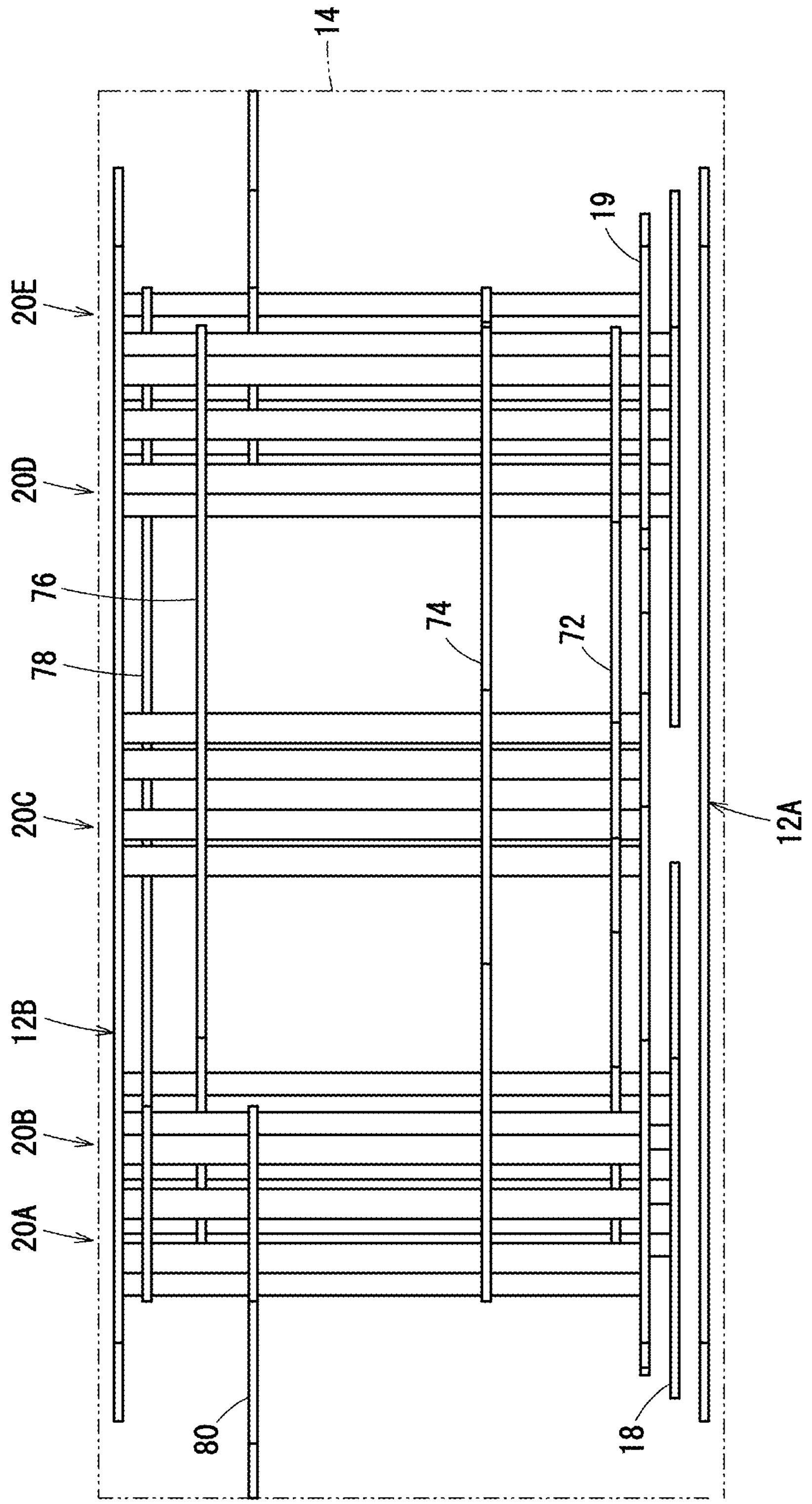
FIG. 3A is a cross-sectional view showing a portion of the filter according to the first embodiment.
Figure 3B:
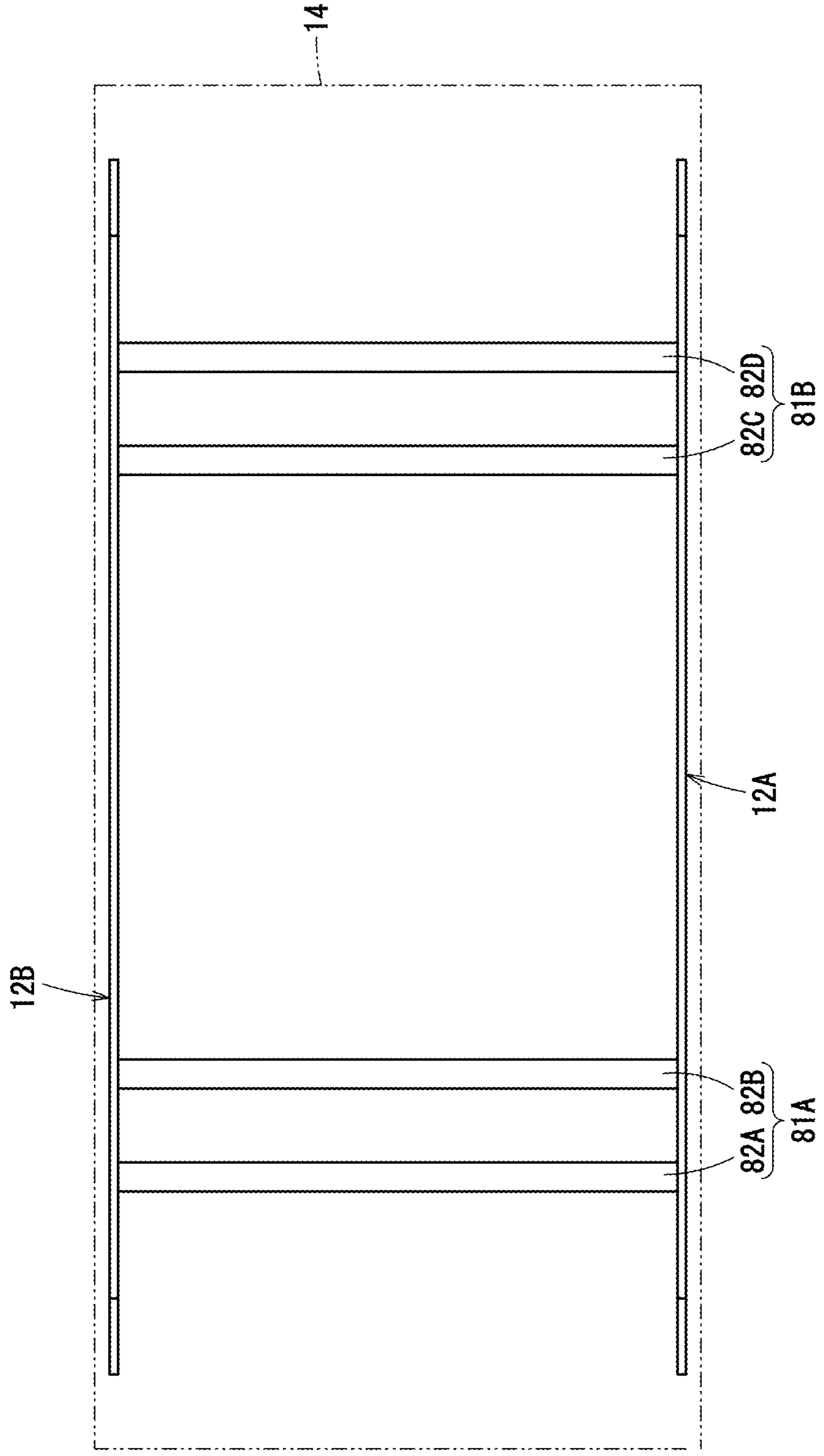
FIG. 3B is a cross-sectional view showing a portion of the filter according to the first embodiment.
Figure 4:
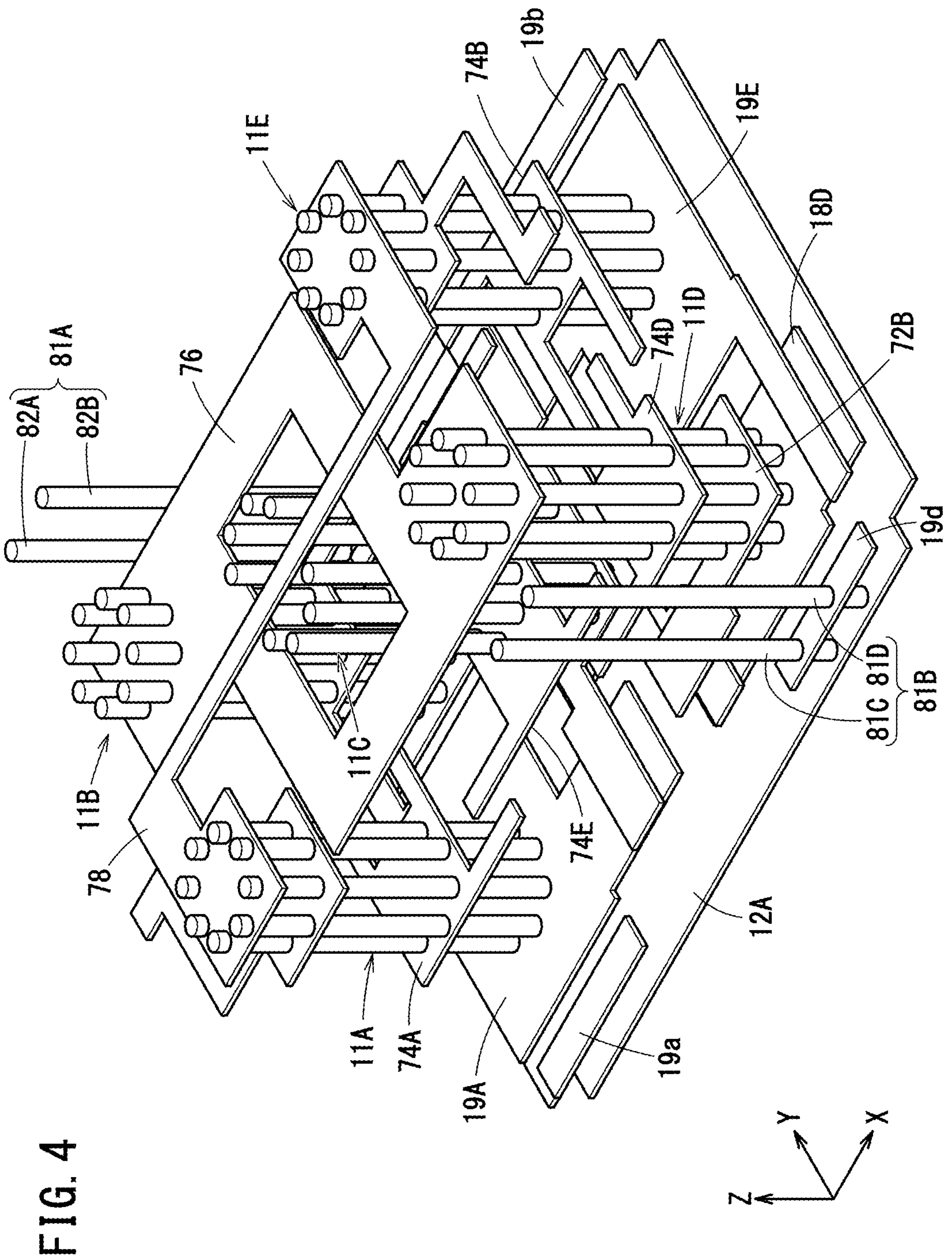
FIG. 4 is a perspective view showing the filter according to the first embodiment.
Figure 5:
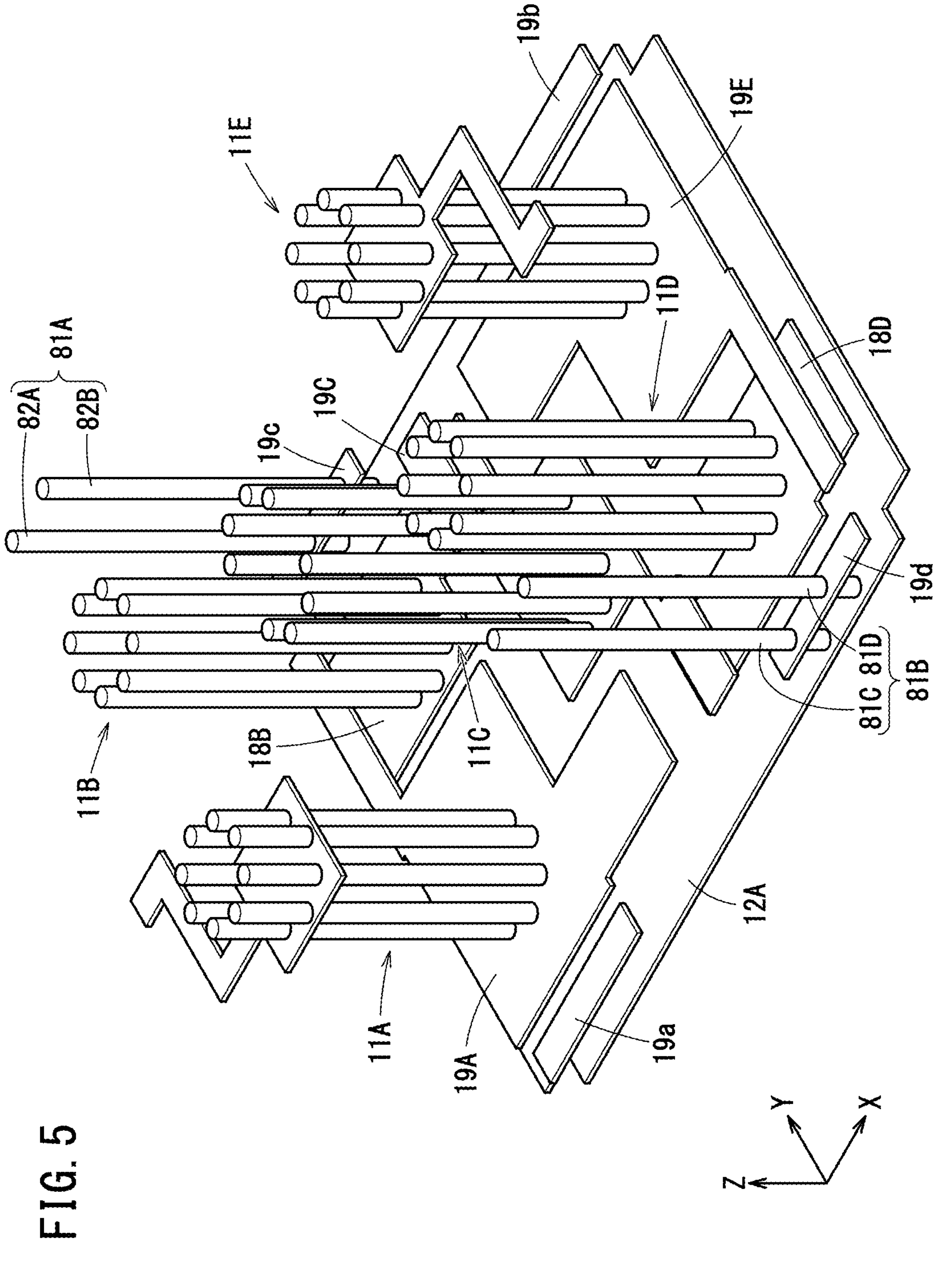
FIG. 5 is a perspective view showing the filter according to the first embodiment.
Figure 6:
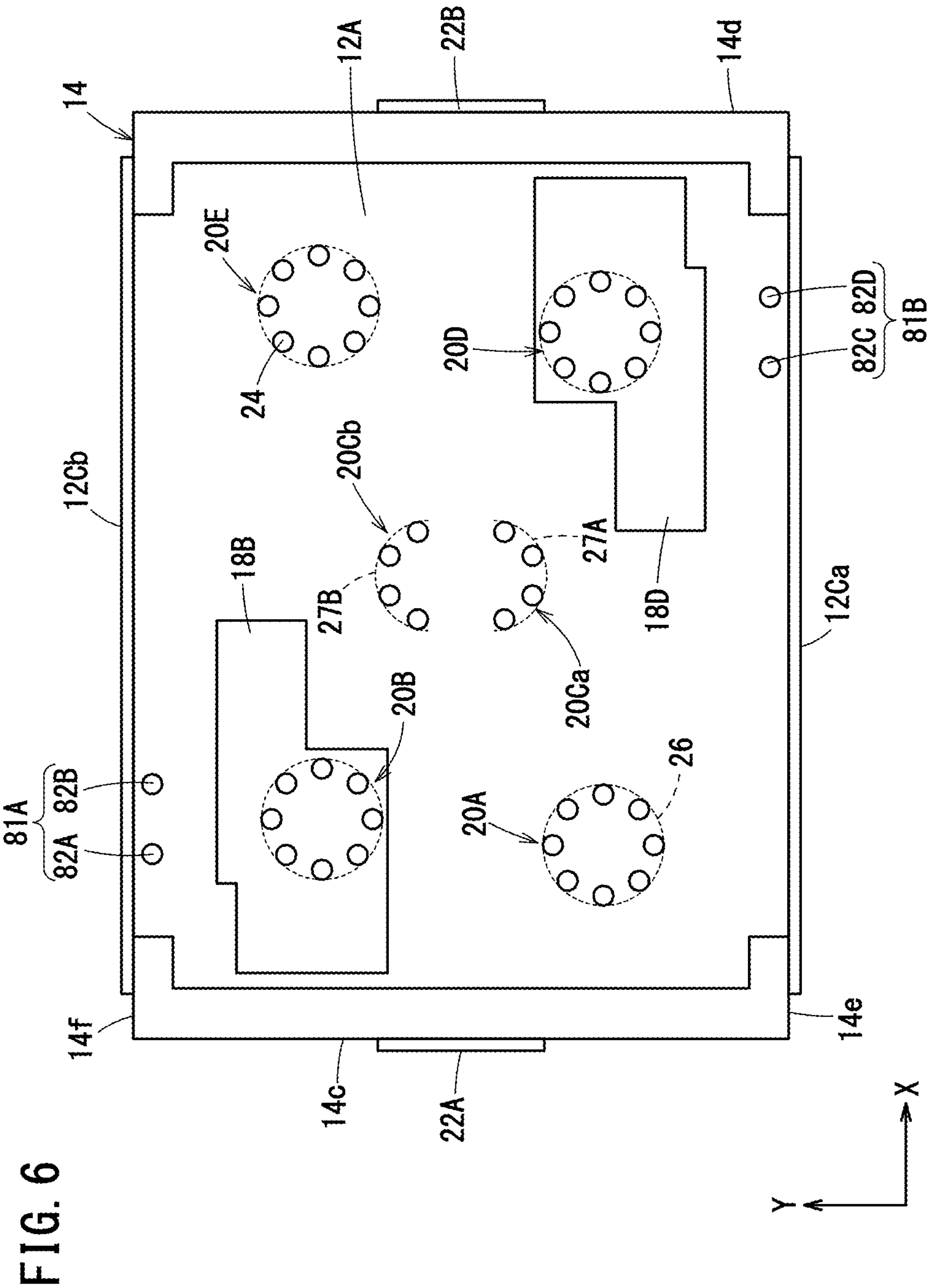
FIG. 6 is a plan view showing the filter according to the first embodiment.
Figure 7:
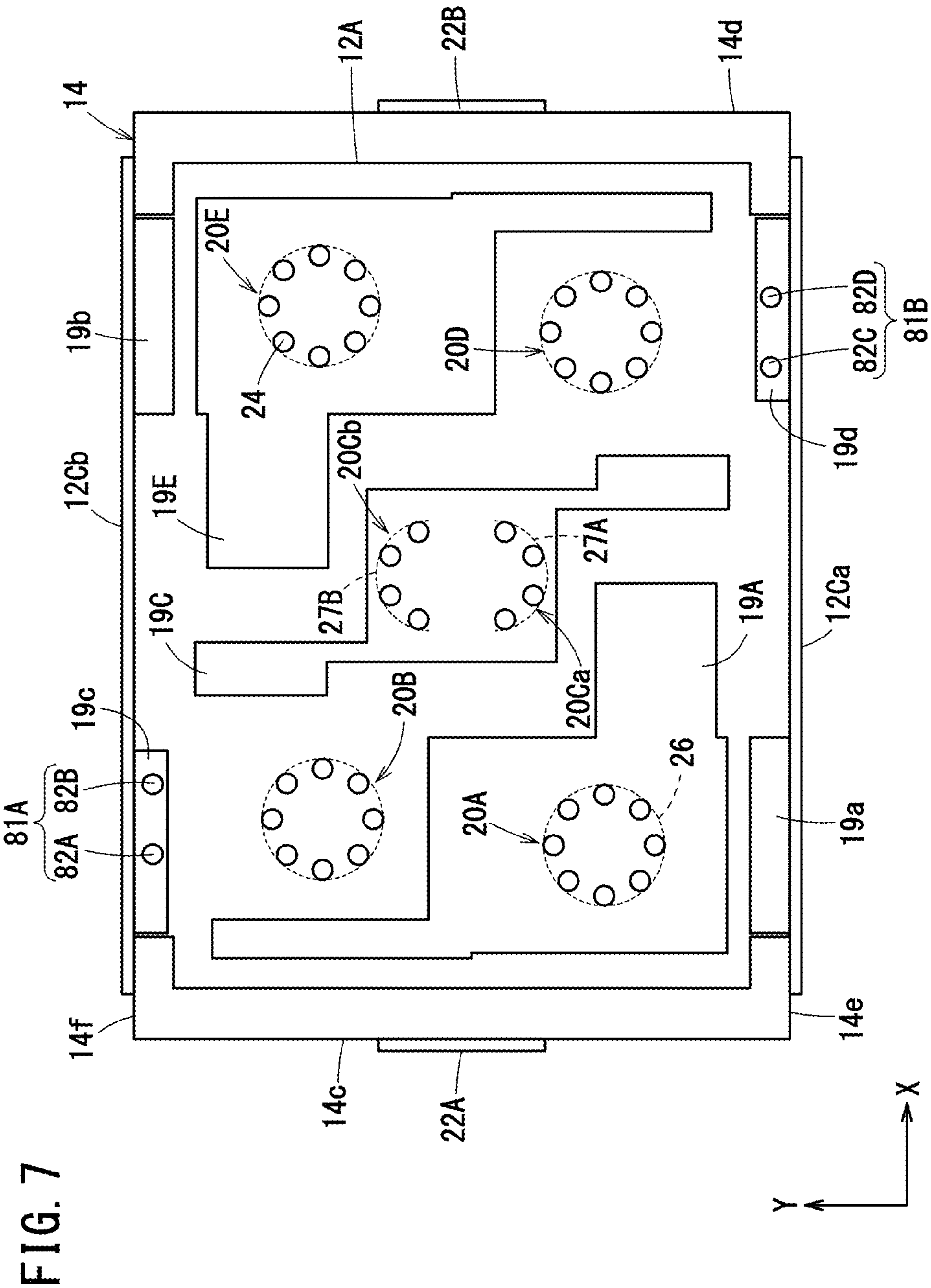
FIG. 7 is a plan view showing the filter according to the first embodiment.
Figure 8:
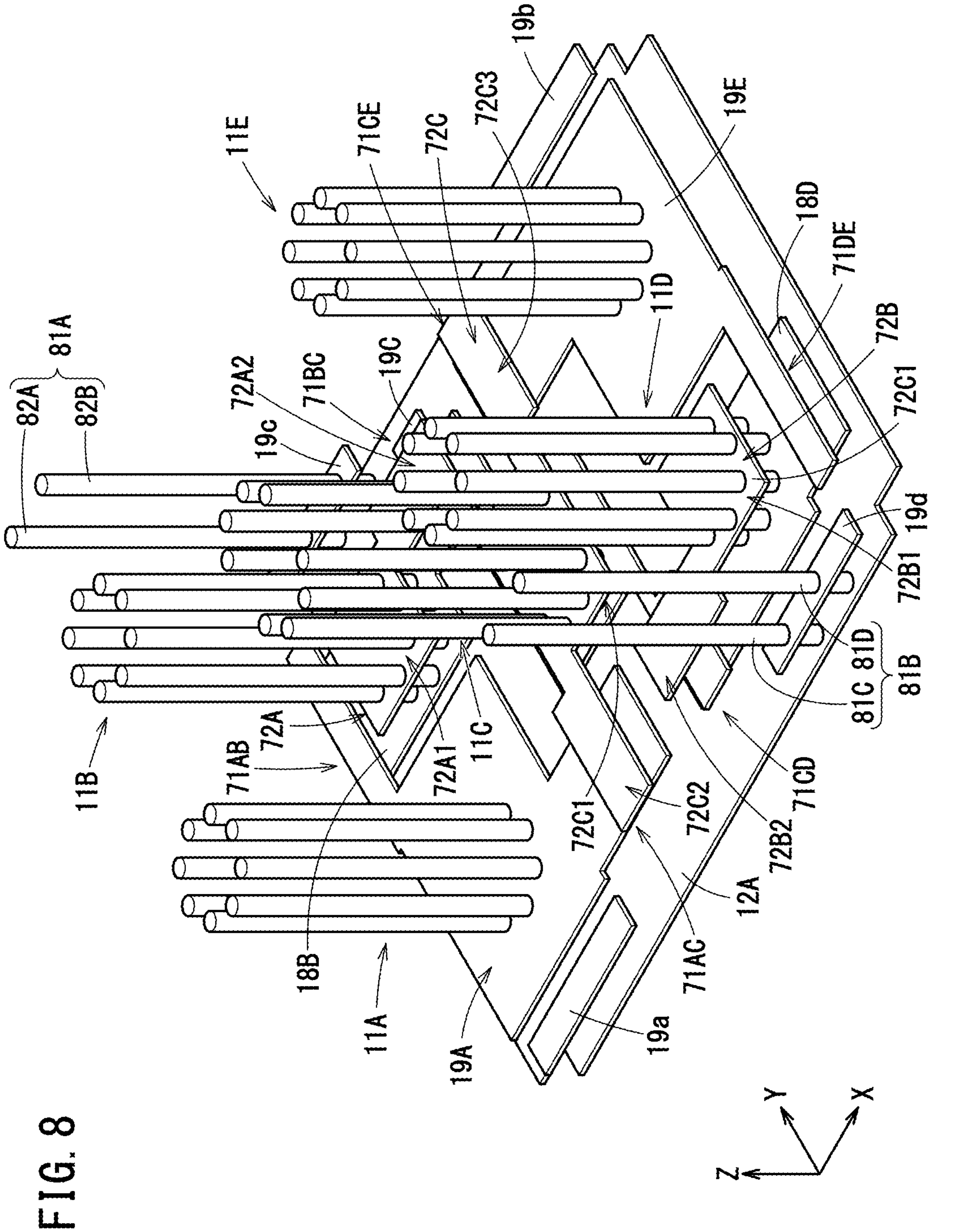
FIG. 8 is a perspective view showing the filter according to the first embodiment.
Figure 9:
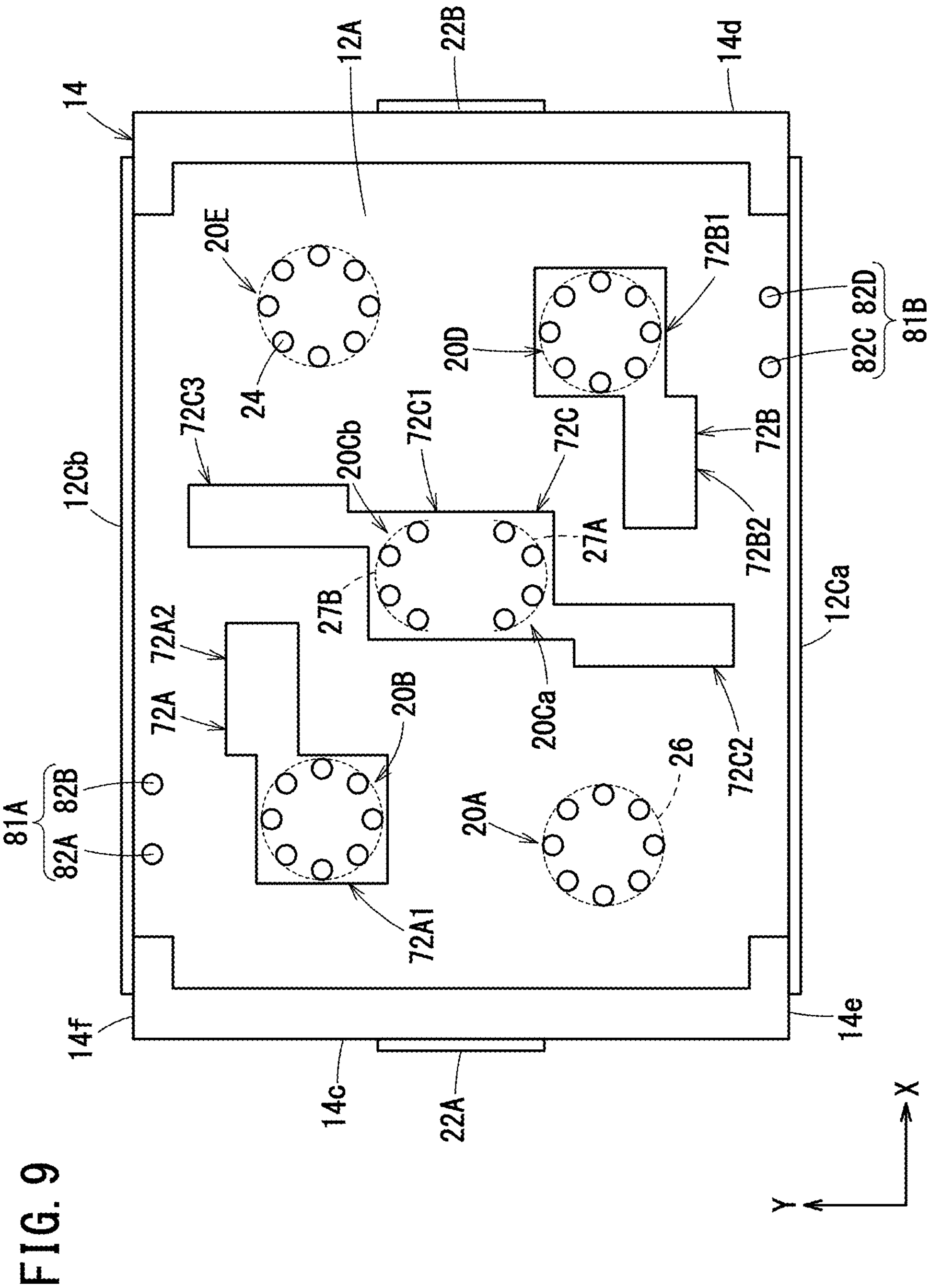
FIG. 9 is a plan view showing the filter according to the first embodiment.
Figure 10:
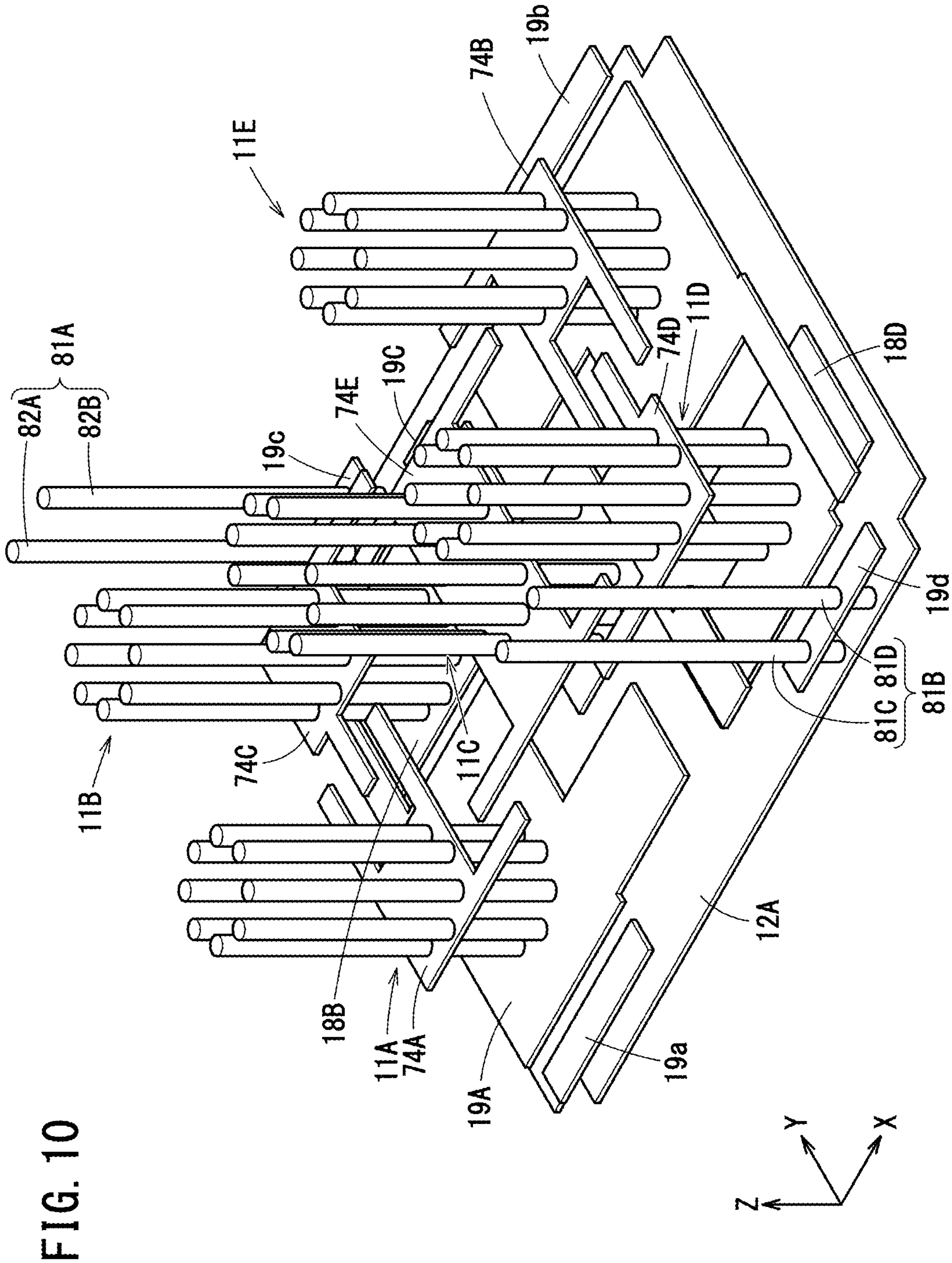
FIG. 10 is a perspective view showing the filter according to the first embodiment.
Figure 11:
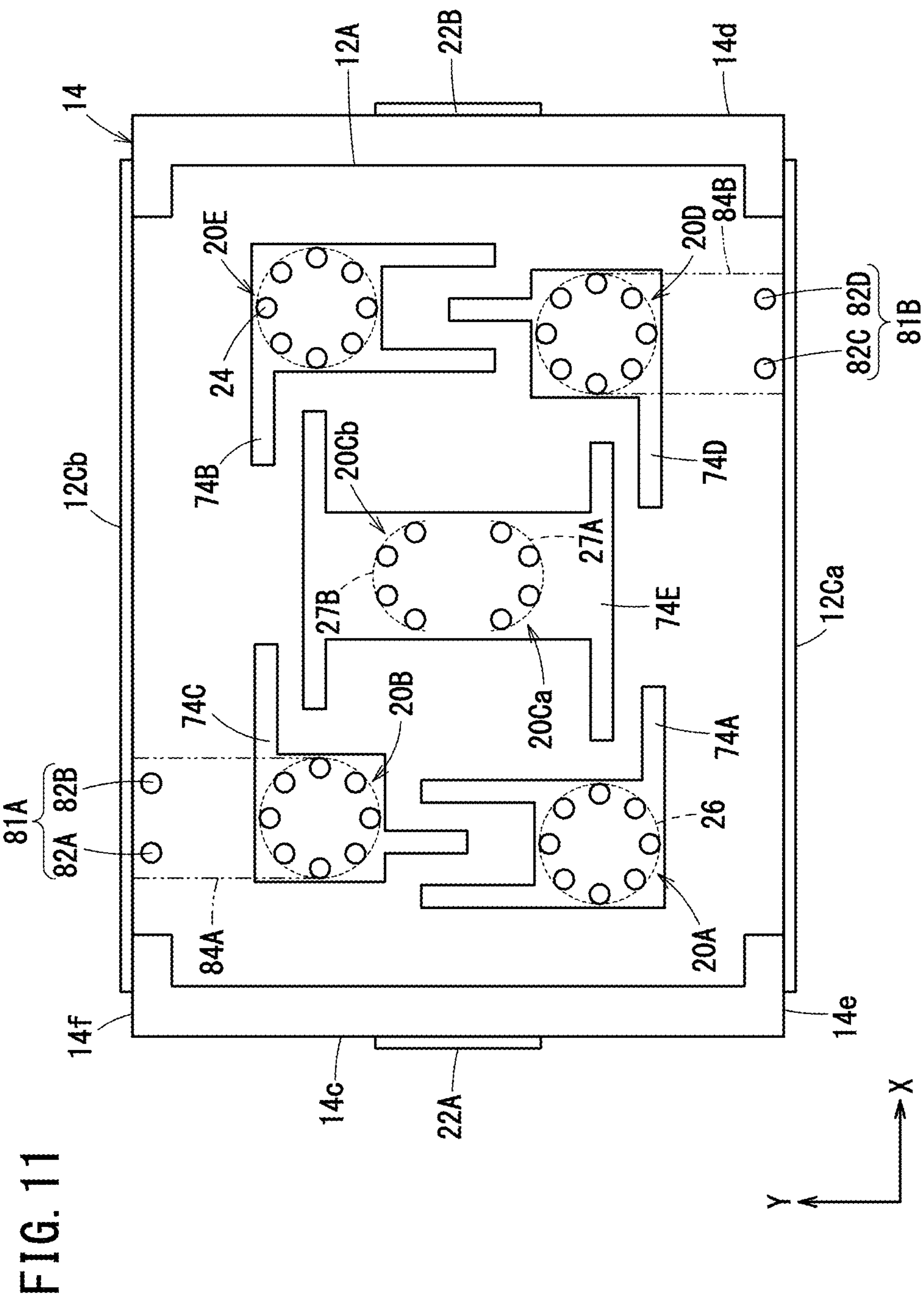
FIG. 11 is a plan view showing the filter according to the first embodiment.
Figure 12:
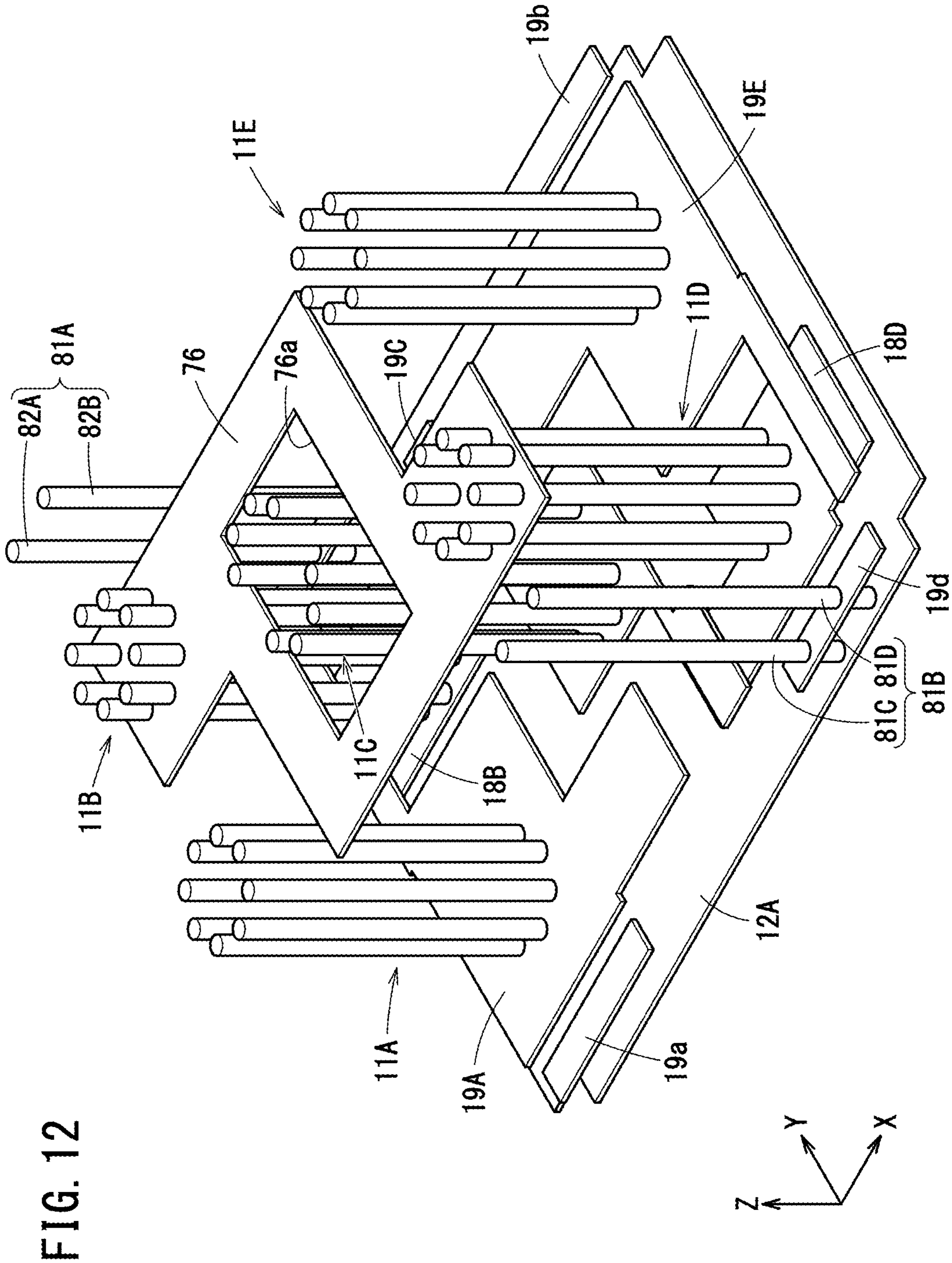
FIG. 12 is a perspective view showing the filter according to the first embodiment.
Figure 13:
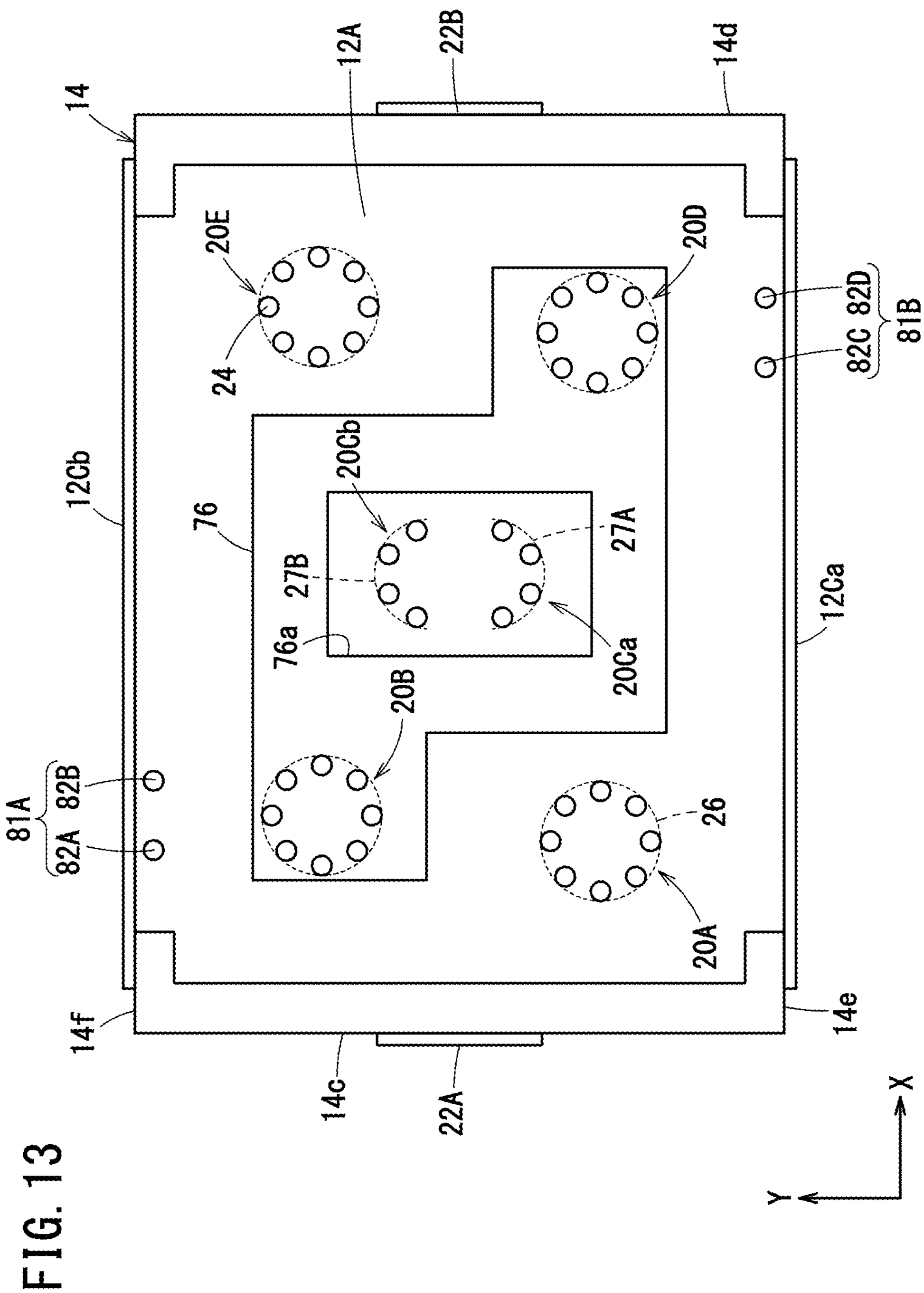
FIG. 13 is a plan view showing the filter according to the first embodiment.
Figure 14:
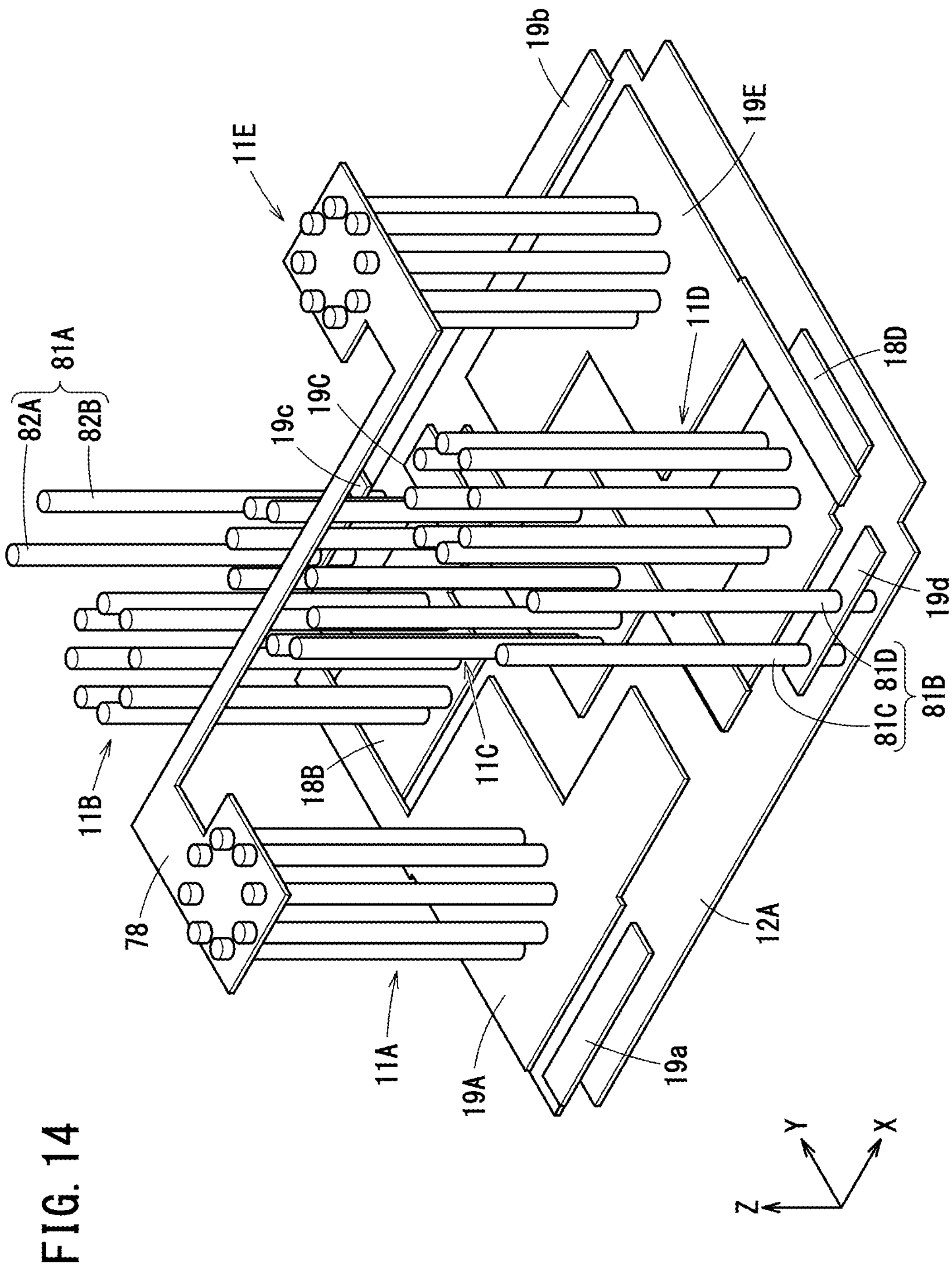
FIG. 14 is a perspective view showing the filter according to the first embodiment.
Figure 15:
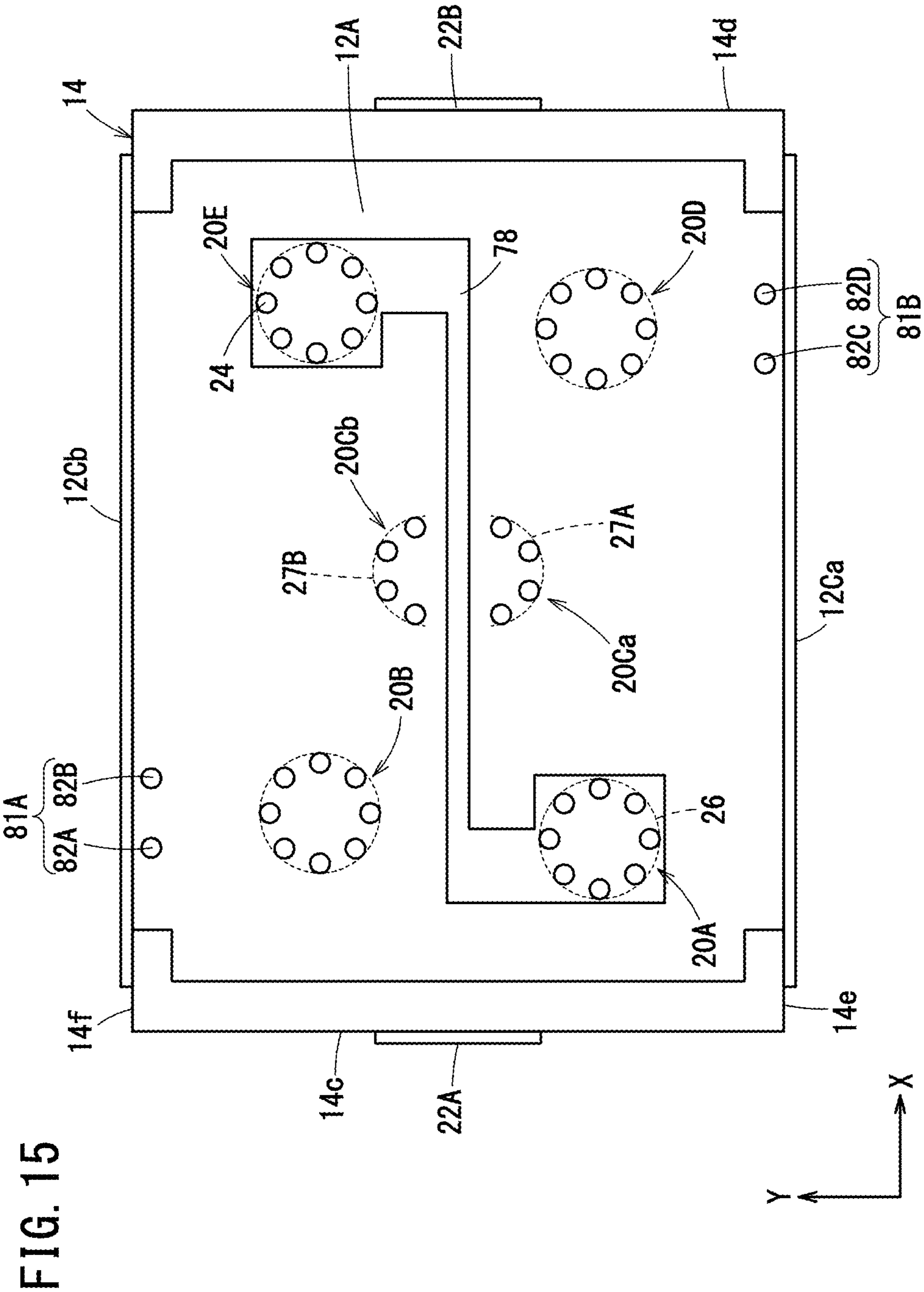
FIG. 15 is a plan view showing the filter according to the first embodiment.
Figure 16:
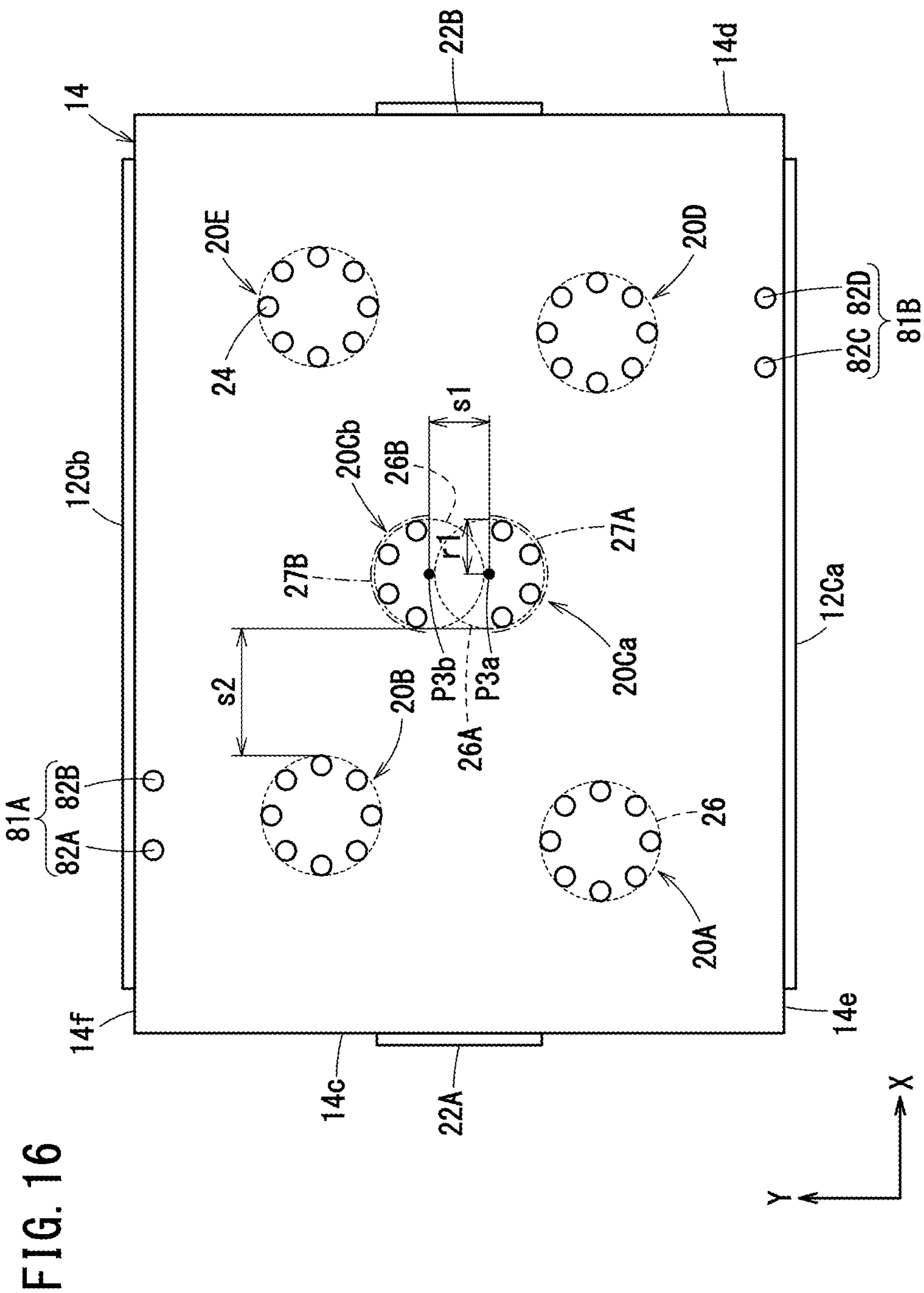
FIG. 16 is a plan view showing the filter according to the first embodiment.

A filter according to a first embodiment will be described with reference to the drawings. FIG. 1 is a perspective view showing the filter according to the present embodiment. FIG. 2 is a plan view showing the filter according to the present embodiment. FIG. 3A and FIG. 3B are cross-sectional views showing portions of the filter according to the present embodiment. FIG. 4 and FIG. 5 are perspective views showing the filter according to the present embodiment. FIG. 6 and FIG. 7 are plan views showing the filter according to the present embodiment. FIG. 8 is a perspective view showing the filter according to the present embodiment. FIG. 9 is a plan view showing the filter according to the present embodiment. FIG. 10 is a perspective view showing the filter according to the present embodiment. FIG. 11 is a plan view showing the filter according to the present embodiment. FIG. 12 is a perspective view showing the filter according to the present embodiment. FIG. 13 is a plan view showing the filter according to the present embodiment. FIG. 14 is a perspective view showing the filter according to the present embodiment. FIG. 15 and FIG. 16 are plan views showing the filter according to the present embodiment. For the sake of simplicity, portions of the constituent elements have been appropriately omitted from FIG. 1 to FIG. 16.

As shown in FIG. 1, a filter 10 according to the present embodiment is equipped with a dielectric substrate 14. The dielectric substrate 14 is formed, for example, in the shape of a rectangular parallelepiped, although the present embodiment is not necessarily limited to this feature. The dielectric substrate 14 is constituted by laminating (stacking in layers) a plurality of ceramic sheets (dielectric ceramic sheets).

The dielectric substrate 14 includes two main surfaces 14*a* and 14*b*, and four side surfaces 14*c* to 14*f*. The main surface 14*a* and the main surface 14*b* are positioned on opposite sides of each other. The direction along a normal direction of the side surface 14*c* and the side surface 14*d* is defined as an X direction. More specifically, the normal direction of the side surfaces 14*c* and 14*d* is defined as the X direction. Stated otherwise, a longitudinal direction of the dielectric substrate 14 is defined as the X direction. The direction along the normal direction of the side surface 14*e* and the side surface 14*f* is defined as a Y direction. More specifically, the normal direction of the side surfaces 14*e* and 14*f* is defined as the Y direction. The direction along the normal direction of the main surfaces 14*a* and 14*b* is defined as a Z direction. More specifically, the normal direction of the main surfaces 14*a* and 14*b* is defined as the Z direction.

A shielding conductor (a lower portion shielding conductor) 12A is formed in the vicinity of the main surface 14*b* from within the dielectric substrate 14. Specifically, the shielding conductor 12A is formed on a lower side of the dielectric substrate 14. A shielding conductor (an upper portion shielding conductor) 12B is formed in the vicinity of the main surface 14*a* from within the dielectric substrate 14. Specifically, the shielding conductor (the upper portion shielding conductor) 12B is formed on an upper side of the dielectric substrate 14.

An input/output terminal (a first input/output terminal) 22A is formed on the side surface 14*c* of the dielectric substrate 14. An input/output terminal (a second input/output terminal) 22B is formed on the side surface 14*d* of the dielectric substrate 14. The input/output terminal 22A is coupled to a via electrode portion 20A, which will be described later, via an input/output pattern 80A. Further, the input/output terminal 22B is coupled to a via electrode portion 20E, which will be described later, via an input/output pattern 80B.

A shielding conductor 12Ca is formed on the side surface 14*e* of the dielectric substrate 14. A shielding conductor 12Cb is formed on the side surface 14*f* of the dielectric substrate 14. The shielding conductors 12Ca and 12Cb are formed in a plate shape. The shielding conductors 12Ca and 12Cb are formed along the longitudinal direction of the dielectric substrate 14.

Within the dielectric substrate 14, capacitor electrodes (strip lines) 18B and 18D are formed that face toward the shielding conductor 12A. The capacitor electrodes 18B and 18D are formed in the same layer. Stated otherwise, the capacitor electrodes 18B and 18D are formed on the same ceramic sheet (not shown). Moreover, when the individual capacitor electrodes are described without distinguishing therebetween, the reference numeral 18 will be used, and when the individual capacitor electrodes are described while distinguishing therebetween, the reference numerals 18B and 18D will be used.

Within the dielectric substrate 14, capacitor electrodes (strip lines) 19A, 19C, and 19E are formed that face toward the shielding conductor 12A. When the individual capacitor electrodes are described without distinguishing therebetween, the reference numeral 19 will be used, and when the individual capacitor electrodes are described while distinguishing therebetween, the reference numerals 19A, 19C, and 19E will be used. The capacitor electrodes 19A, 19C, and 19E are formed in the same layer. Stated otherwise, the capacitor electrodes 19A, 19C, and 19E are formed on the same ceramic sheet (not shown). The capacitor electrodes 18 and the capacitor electrodes 19 are formed in different layers. One or more non-illustrated ceramic sheets exist between the capacitor electrodes 18 and the capacitor electrodes 19. The layer in which the capacitor electrodes 19 are positioned is located upwardly with respect to the layer in which the capacitor electrodes 18 are positioned.

The capacitor electrodes 18 are formed in point symmetry, with the center C of the dielectric substrate 14 as viewed in plan serving as the center of symmetry. The capacitor electrode 18B and the capacitor electrode 18D are formed in point symmetry, with the center C of the dielectric substrate 14 as viewed in plan serving as the center of symmetry. In the present embodiment, the feature in which the capacitor electrodes 18 are formed in point symmetry is in order to obtain satisfactory frequency characteristics.

The capacitor electrodes 19 are formed in point symmetry, with the center C of the dielectric substrate 14 as viewed in plan serving as the center of symmetry. The capacitor electrode 19A and the capacitor electrode 19E are formed in point symmetry, with the center C of the dielectric substrate 14 as viewed in plan serving as the center of symmetry. The capacitor electrode 19C is formed in point symmetry, with the center C of the dielectric substrate 14 as viewed in plan serving as the center of symmetry. In the present embodiment, the feature in which the capacitor electrodes 19 are formed in point symmetry is in order to obtain satisfactory frequency characteristics.

As shown in FIG. 2, the capacitor electrode 18B includes partial patterns (electrode patterns) 18B1 to 18B3. The partial pattern 18B1 is connected to a via electrode portion 20B, which will be described later. One end of the partial pattern 18B2 is connected to the partial pattern 18B1. The partial pattern 18B2 projects out in the −X direction. One end of the partial pattern 18B3 is connected to the partial pattern 18B1. The partial pattern 18B3 projects out in the +X direction.

The capacitor electrode 18D includes partial patterns (electrode patterns) 18D1 to 18D3. The partial pattern 18D1 is connected to a via electrode portion 20D, which will be described later. One end of the partial pattern 18D2 is connected to the partial pattern 18D1. The partial pattern 18D2 projects out in the +X direction. One end of the partial pattern 18D3 is connected to the partial pattern 18D1. The partial pattern 18D3 projects out in the −X direction.

The capacitor electrode 19A includes partial patterns (electrode patterns) 19A1 to 19A3. The partial pattern 19A1 is connected to the via electrode portion 20A, which will be described later. One end of the partial pattern 19A2 is connected to the partial pattern 19A1. The partial pattern 19A2 projects out in the +X direction. One end of the partial pattern 19A3 is connected to the partial pattern 19A1. The partial pattern 19A3 projects out in the +Y direction. A portion of the partial pattern 19A3 overlaps with a portion of the partial pattern 18B2 as viewed in plan.

The capacitor electrode 19C includes partial patterns (electrode patterns) 19C1 to 19C3. The partial pattern 19C1 is connected to a via electrode portion 20C (refer to FIG. 2), which will be described later. One end of the partial pattern 19C2 is connected to the partial pattern 19C1. The partial pattern 19C2 projects out in the +Y direction. One end of the partial pattern 19C3 is connected to the partial pattern 19C1. The partial pattern 19C3 projects out in the −Y direction. A portion of the partial pattern 19C2 overlaps with a portion of the partial pattern 18B3 as viewed in plan. A portion of the partial pattern 19C3 overlaps with a portion of the partial pattern 18D3 as viewed in plan.

The capacitor electrode 19E includes partial patterns (electrode patterns) 19E1 to 19E3. The partial pattern 19E1 is connected to the via electrode portion 20E, which will be described later. One end of the partial pattern 19E2 is connected to the partial pattern 19E1. The partial pattern 19E2 projects out in the −X direction. One end of the partial pattern 19E3 is connected to the partial pattern 19E1. The partial pattern 19E3 projects out in the −Y direction. A portion of the partial pattern 19E3 overlaps with a portion of the partial pattern 18D2 as viewed in plan.

Further formed inside the dielectric substrate 14 are electrode patterns 19*a* and 19*d* connected to the shielding conductor 12Ca, and electrode patterns 19*b* and 19*c* connected to the shielding conductor 12Cb. The electrode pattern 19*a* is positioned in the −Y direction with respect to the partial pattern 19A1. The electrode pattern 19*b* is positioned in the +Y direction with respect to the partial pattern 19E1. The electrode pattern 19*c* is positioned in the +Y direction with respect to the partial pattern 18B1. The electrode pattern 19*d* is positioned in the −Y direction with respect to the partial pattern 18D1.

As shown in FIG. 1, the via electrode portions 20A to 20E are further formed inside the dielectric substrate 14. Moreover, when the individual via electrode portions are described without distinguishing therebetween, the reference numeral 20 will be used, and when the individual via electrode portions are described while distinguishing therebetween, the reference numerals 20A to 20E will be used.

The via electrode portions 20 are constituted by a plurality of via electrodes 24. The via electrodes 24 are embedded respectively into via holes that are formed in the dielectric substrate 14.

Ends (lower ends) of the via electrode portions 20B and 20D are connected to the capacitor electrodes 18B and 18D. Ends (lower ends) of the via electrode portions 20A, 20C, and 20E are connected to the capacitor electrodes 19A, 19C, and 19E. Other ends (upper ends) of the via electrode portions 20 are connected to the shielding conductor 12B. The longitudinal direction of the via electrode portions 20 is aligned along the normal direction of the main surfaces 14*a* and 14*b*. In this manner, the via electrode portions 20 are formed from the capacitor electrodes 18 and 19 until reaching the shielding conductor 12B.

A structural body 16A is constituted by the capacitor electrode 19A and the via electrode portion 20A. A structural body 16B is constituted by the capacitor electrode 18B and the via electrode portion 20B. A structural body 16C is constituted by the capacitor electrode 19C and the via electrode portion 20C. A structural body 16D is constituted by the capacitor electrode 18D and the via electrode portion 20D. A structural body 16E is constituted by the capacitor electrode 19E and the via electrode portion 20E. Moreover, when the individual structural bodies are described without distinguishing therebetween, the reference numeral 16 will be used, and when the individual structural bodies are described while distinguishing therebetween, the reference numerals 16A to 16E will be used.

A plurality of resonators 11A to 11E, each respectively including one of the structural bodies 16, are provided in the filter 10. Moreover, when the individual resonators are described without distinguishing therebetween, the reference numeral 11 will be used, and when the individual resonators are described while distinguishing therebetween, the reference numerals 11A to 11E will be used.

The resonator 11A and the resonator 11B are arranged so as to be adjacent to each other. The resonator 11B and the resonator 11C are arranged so as to be adjacent to each other. The resonator 11C and the resonator 11D are arranged so as to be adjacent to each other. The resonator 11D and the resonator 11E are arranged so as to be adjacent to each other.

As shown in FIG. 2, the via electrode portion 20A, the via electrode portion 20B, the via electrode portion 20C, the via electrode portion 20D, and the via electrode portion 20E are shifted mutually from each other in the X direction. The via electrode portion 20C is positioned at the center C of the dielectric substrate 14 as viewed in plan. The position of a center P3 of the via electrode portion 20C as viewed in plan coincides with the position of the center C of the dielectric substrate 14 as viewed in plan.

The position in the X direction of the center P3 of the via electrode portion 20C is between the position in the X direction of the center P1 of the via electrode portion 20A, and the position in the X direction of the center P5 of the via electrode portion 20E. Preferably, the distance between the position in the X direction of the center P3 of the via electrode portion 20C, and the position in the X direction of the center P1 of the via electrode portion 20A is equivalent to the distance between the position in the X direction of the center P3 of the via electrode portion 20C, and the position in the X direction of the center P5 of the via electrode portion 20E.

Similarly, the position in the Y direction of the center P3 of the via electrode portion 20C is between the position in the Y direction of the center P1 of the via electrode portion 20A, and the position in the Y direction of the center P5 of the via electrode portion 20E. Preferably, the distance between the position in the Y direction of the center P3 of the via electrode portion 20C, and the position in the Y direction of the center P1 of the via electrode portion 20A is equivalent to the distance between the position in the Y direction of the center P3 of the via electrode portion 20C, and the position in the Y direction of the center P5 of the via electrode portion 20E.

The position in the Y direction of the center P1 of the via electrode portion 20A is equivalent to the position in the Y direction of the center P4 of the via electrode portion 20D. The position in the Y direction of the center P2 of the via electrode portion 20B is equivalent to the position in the Y direction of the center P5 of the via electrode portion 20E.

The via electrode portion 20B and the via electrode portion 20E are shifted in the Y direction with respect to the via electrode portion 20A and the via electrode portion 20D. The via electrode portion 20A and the via electrode portion 20D are positioned on a side of the side surface 14*e*. Specifically, the distance between the via electrode portions 20A and 20D and the shielding conductor 12Ca is smaller than the distance between the via electrode portions 20A and 20D and the shielding conductor 12Cb. The via electrode portions 20B and 20E are positioned on a side of the side surface 14*f*. Specifically, the distance between the via electrode portions 20B and 20E and the shielding conductor 12Cb is smaller than the distance between the via electrode portions 20B and 20E and the shielding conductor 12Ca.

The position in the X direction of the center P2 of the via electrode portion 20B is between the position in the X direction of the center P1 of the via electrode portion 20A, and the position in the X direction of the center P3 of the via electrode portion 20C. The position in the X direction of the center P4 of the via electrode portion 20D is between the position in the X direction of the center P3 of the via electrode portion 20C, and the position in the X direction of the center P5 of the via electrode portion 20E.

In this manner, according to the present embodiment, the position of the center P1 of the via electrode portion 20A and the position of the center P2 of the via electrode portion 20B are shifted mutually from each other not only in the X direction but also in the Y direction. Therefore, according to the present embodiment, without increasing the distance in the X direction between the via electrode portions 20A and 20B, the distance between the via electrode portions 20A and 20B can be made greater.

Further, according to the present embodiment, the position of the center P2 of the via electrode portion 20B and the position of the center P3 of the via electrode portion 20C are shifted mutually from each other not only in the X direction but also in the Y direction. Therefore, according to the present embodiment, without increasing the distance in the X direction between the via electrode portions 20B and 20C, the distance between the via electrode portions 20B and 20C can be made greater.

Further, according to the present embodiment, the position of the center P3 of the via electrode portion 200 and the position of the center P4 of the via electrode portion 20D are shifted mutually from each other not only in the X direction but also in the Y direction. Therefore, according to the present embodiment, without increasing the distance in the X direction between the via electrode portions 20C and 20D, the distance between the via electrode portions 20C and 20D can be made greater.

Further, according to the present embodiment, the position of the center P4 of the via electrode portion 20D and the position of the center P5 of the via electrode portion 20E are shifted mutually from each other not only in the X direction but also in the Y direction. Therefore, according to the present embodiment, without increasing the distance in the X direction between the via electrode portions 20D and 20E, the distance between the via electrode portions 20D and 20E can be made greater.

In this manner, according to the present embodiment, without increasing the distance in the X direction between the adjacent resonators 11A to 11E, it is possible to reduce the degree of coupling between the adjacent resonators 11A to 11E. Therefore, according to the present embodiment, while keeping the size of the filter 10 small, it is possible to obtain the filter 10 having satisfactory characteristics.

The positions in the Y direction of the center P1 of the via electrode portion 20A and the center P4 of the via electrode portion 20D are positioned on a side of the side surface 14*e* with respect to the position in the Y direction of the center C of the dielectric substrate 14. The positions in the Y direction of the center P2 of the via electrode portion 20B and the center P5 of the via electrode portion 20E are positioned on a side of the side surface 14*f* with respect to the position in the Y direction of the center C of the dielectric substrate 14. The positions in the Y direction of the center of the input/output terminals 22A and the center of the input/output terminal 22B are set to be equivalent to the position in the Y direction of the center C of the dielectric substrate 14.

From among the five via electrode portions 20A to 20E, the via electrode portion 20 that is closest in proximity to the input/output terminal 22A is the via electrode portion 20A. The distance in the X direction between the position of the center P1 of the via electrode portion 20A and the position of the input/output terminal 22A is smaller than the distance in the X direction between the position of the center P2 of the via electrode portion 20B and the position of the input/output terminal 22A. The distance in the Y direction between the position of the center P1 of the via electrode portion 20A and the position of the input/output terminal 22A is equivalent to the distance in the Y direction between the position of the center P2 of the via electrode portion 20B and the position of the input/output terminal 22A.

From among the five via electrode portions 20A to 20E, the via electrode portion 20 that is closest in proximity to the input/output terminal 22B is the via electrode portion 20E. The distance in the X direction between the position of the center P5 of the via electrode portion 20E and the position of the input/output terminal 22B is smaller than the distance in the X direction between the position of the center P4 of the via electrode portion 20D and the position of the input/output terminal 22B. The distance in the Y direction between the position of the center P5 of the via electrode portion 20E and the position of the input/output terminal 22B is equivalent to the distance in the Y direction between the position of the center P4 of the via electrode portion 20D and the position of the input/output terminal 22B.

The resonators 11A to 11E are arranged at positions that are point symmetrical, with the center C of the dielectric substrate 14 as viewed in plan serving as the center of symmetry. Specifically, the resonator 11A and the resonator 11E are arranged at positions that are point symmetrical, with the center C of the dielectric substrate 14 as viewed in plan serving as the center of symmetry. Further, the resonator 11B and the resonator 11D are also disposed at positions that are point symmetrical, with the center C of the dielectric substrate 14 as viewed in plan serving as the center of symmetry. The resonator 11C is positioned at the center C of the dielectric substrate 14 as viewed in plan. In the present embodiment, the feature in which the resonators 11A to 11E are formed in point symmetry is in order to obtain satisfactory frequency characteristics.

As shown in FIG. 2, the via electrodes 24 that make up the via electrode portions 20A, 20B, 20D, and 20E are each arranged along an imaginary circle 26 as viewed in plan. Since the via electrode portions 20 are formed by arranging the plurality of via electrodes 24 along the imaginary circle 26, the via electrode portions 20 can behave such as a large-diameter via electrode corresponding to the imaginary circle 26. Since the via electrode portions 20 are constituted by the plurality of via electrodes 24 each having a comparatively small diameter, the manufacturing process can be simplified. Further, since the via electrode portions 20 are constituted by the plurality of via electrodes 24 each having a comparatively small diameter, any variation in the diameters of the via electrode portions 20 can be reduced. Further, since the via electrode portions 20 are constituted by the plurality of via electrodes 24 each having a comparatively small diameter, the amount of material such as silver or the like that is embedded into the vias can be reduced, and thereby a reduction in cost can be achieved.

The via electrode portion 20C is divided into a partial electrode portion 20Ca and a partial electrode portion 20Cb. The partial electrode portion 20Ca is constituted by the plurality of via electrodes 24. The partial electrode portion 20Cb is also constituted by the plurality of via electrodes 24. The partial electrode portion 20Ca and the partial electrode portion 20Cb are spaced apart from each other in the Y direction. The plurality of via electrodes 24 constituting the partial electrode portion 20Ca are arranged along an imaginary arc 27A constituting a portion of an imaginary circle 26A (refer to FIG. 16) as viewed in plan. The plurality of via electrodes 24 constituting the partial electrode portion 20Cb are arranged along an imaginary arc 27B constituting a portion of an imaginary circle 26B (refer to FIG. 16) as viewed in plan. When the individual imaginary circles are described without distinguishing therebetween, the reference numeral 26 will be used, and when the individual imaginary circles are described while distinguishing therebetween, the reference numerals 26A and 26B will be used. When the individual imaginary arcs are described without distinguishing therebetween, the reference numeral 27 will be used, and when the individual imaginary arcs are described while distinguishing therebetween, the reference numerals 27A and 27B will be used.

The distance s1 (refer to FIG. 16) between the center P3*a* of the imaginary circle 26A and the center P3*b* of the imaginary circle 26B may be set, for example, to 0.2565 mm, although the present embodiment is not limited to this feature. Although not limited to this feature, a radius r1 of the imaginary circle 26 may be set, for example, to 0.29 mm. Stated otherwise, although not limited to this feature, the diameter of the imaginary circle 26 may be set to 0.58 mm. A gap s2 in the X direction between the imaginary circle 26 corresponding to the via electrode portion 20B, and the imaginary circle 26 corresponding to the via electrode portion 20C can be set, for example, to 0.595 mm, although the present embodiment is not limited to this feature. A distance s1 between the center P3*a* of the imaginary circle 26A and the center P3*b* of the imaginary circle 26B is preferably greater than or equal to 0.7 times the radius r1 of the imaginary circles 26A and 26B. In the present embodiment, the distance s1 between the center P3*a* of the imaginary circle 26A and the center P3*b* of the imaginary circle 26B is set to be 0.884 times the radius r1 of the imaginary circles 26A and 26B.

In the present embodiment, the via electrode portion 20C is divided into the partial electrode portion 20Ca and the partial electrode portion 20Cb, and the partial electrode portion 20Ca and the partial electrode portion 20Cb are spaced apart from each other in the Y direction for the following reason. Specifically, the via electrode portion 20C is positioned at a comparatively large distance from the shielding conductors 12Ca and 12Cb. Therefore, in the case that the filter 10 is simply reduced in height, the size of the capacitor electrode 19C required in order to obtain the desired filter characteristics becomes significantly smaller. When the size of the capacitor electrode 19C becomes significantly smaller, manufacturing of the filter 10 becomes difficult. In contrast to this feature, when the via electrode portion 20C is divided into the partial electrode portion 20Ca and the partial electrode portion 20Cb, and the partial electrode portion 20Ca and the partial electrode portion 20Cb are spaced apart from each other in the Y direction, the following situation occurs. Specifically, the distance between the partial electrode portion 20Ca and the shielding conductor 12Ca becomes smaller and the distance between the partial electrode portion 20Cb and the shielding conductor 12Cb becomes smaller. When the distance between the partial electrode portion 20Ca and the shielding conductor 12Ca becomes smaller, and together therewith, the distance between the partial electrode portion 20Cb and the shielding conductor 12Cb becomes smaller, the size of the capacitor electrode 19C required in order to obtain the desired filter characteristics increases. Specifically, when the distance between the partial electrode portion 20Ca and the shielding conductor 12Ca becomes smaller, and together therewith, the distance between the partial electrode portion 20Cb and the shielding conductor 12Cb becomes smaller, the size of the capacitor electrode 19C required in order to obtain the desired filter characteristics can become of an appropriate size. For these reasons, in the present embodiment, the via electrode portion 20C is divided into the partial electrode portion 20Ca and the partial electrode portion 20Cb, and the partial electrode portion 20Ca and the partial electrode portion 20Cb are spaced apart from each other in the Y direction.

In this manner, in the present embodiment, in the resonator 11C, the via electrode portion 20C is divided into the partial electrode portion 20Ca and the partial electrode portion 20Cb, and the partial electrode portion 20Ca and the partial electrode portion 20Cb are spaced apart from each other in the Y direction. On the other hand, the resonators 11A, 11B, 11D, and 11E, except for the resonator 11C, each include one undivided via electrode portion 20A, 20B, 20D, and 20E.

As shown in FIG. 8 and FIG. 9, coupling capacitance electrodes (plate electrodes) 72A to 72C are formed within the dielectric substrate 14. The coupling capacitance electrode 72A is connected to the via electrode portion 20B provided in the resonator 11B. The coupling capacitance electrode 72B is connected to the via electrode portion 20D provided in the resonator 11D. The coupling capacitance electrode 72C is connected to the via electrode portion 20C provided in the resonator 11C. The coupling capacitance electrodes 72A to 72C are formed in the same layer. Stated otherwise, the coupling capacitance electrodes 72A to 72C are formed on the same ceramic sheet (not shown). When the individual coupling capacitance electrodes are described without distinguishing therebetween, the reference numeral 72 will be used, and when the individual coupling capacitance electrodes are described while distinguishing therebetween, the reference numerals 72A to 72C will be used. One or more non-illustrated ceramic sheets exist between the coupling capacitance electrodes 72 and the capacitor electrodes 19.

The coupling capacitance electrodes 72 are formed in point symmetry, with the center C of the dielectric substrate 14 as viewed in plan serving as the center of symmetry. The coupling capacitance electrode 72A and the coupling capacitance electrode 72B are formed in point symmetry, with the center C of the dielectric substrate 14 as viewed in plan serving as the center of symmetry. The coupling capacitance electrode 72C is formed in point symmetry, with the center C of the dielectric substrate 14 as viewed in plan serving as the center of symmetry. In the present embodiment, the feature in which the coupling capacitance electrodes 72 are formed in point symmetry is in order to obtain satisfactory frequency characteristics.

The coupling capacitance electrode 72A includes partial patterns (electrode patterns) 72A1 and 72A2. The partial pattern 72A1 is connected to the via electrode portion 20B. One end of the partial pattern 72A2 is connected to the partial pattern 72A1. The partial pattern 72A2 projects out in the +X direction. A portion of the partial pattern 72A2 overlaps with a portion of the partial pattern 19C2 as viewed in plan.

The coupling capacitance electrode 72B includes partial patterns (electrode patterns) 72B1 and 72B2. The partial pattern 72B1 is connected to the via electrode portion 20D. One end of the partial pattern 72B2 is connected to the partial pattern 72B1. The partial pattern 72B2 projects out in the −X direction. A portion of the partial pattern 72B2 overlaps with a portion of the partial pattern 19C3 as viewed in plan.

The coupling capacitance electrode 72C includes partial patterns (electrode patterns) 72C1, 72C2, and 72C3. The partial pattern 72C1 is connected to the via electrode portion 20C. One end of the partial pattern 72C2 is connected to the partial pattern 72C1. The partial pattern 72C2 projects out in the −Y direction. A portion of the partial pattern 72C2 overlaps with a portion of the partial pattern 19A2 as viewed in plan. One end of the partial pattern 72C3 is connected to the partial pattern 72C1. The partial pattern 72C3 projects out in the +Y direction. A portion of the partial pattern 72C3 overlaps with a portion of the partial pattern 19E2 as viewed in plan.

As noted previously, a portion of the partial pattern 19A3 and a portion of the partial pattern 18B2 overlap with each other. In this manner, a capacitive coupling structure 71AB (refer to FIG. 8) is constituted including the partial pattern 19A3 and the partial pattern 18B2.

As noted previously, a portion of the partial pattern 19E3 and a portion of the partial pattern 18D2 overlap with each other. In this manner, a capacitive coupling structure 71DE (refer to FIG. 8) is constituted including the partial pattern 19E3 and the partial pattern 18D2.

As noted previously, a portion of the partial pattern 18B3, a portion of the partial pattern 19C2, and a portion of the partial pattern 72A2 overlap with each other. In this manner, a capacitive coupling structure 71BC (refer to FIG. 8) is constituted including the partial pattern 18B3, the partial pattern 19C2, and the partial pattern 72A2.

As noted previously, a portion of the partial pattern 18D3, a portion of the partial pattern 19C3, and a portion of the partial pattern 72B2 overlap with each other. In this manner, a capacitive coupling structure 71CD (refer to FIG. 8) is constituted including the partial pattern 18D3, the partial pattern 19C3, and the partial pattern 72B2.

As noted previously, a portion of the partial pattern 19A2 and a portion of the partial pattern 72C2 overlap with each other. In this manner, a capacitive coupling structure 71AC (refer to FIG. 8) is constituted including the partial pattern 19A2 and the partial pattern 72C2.

As noted previously, a portion of the partial pattern 19E2 and a portion of the partial pattern 72C3 overlap with each other. In this manner, a capacitive coupling structure 71CE (refer to FIG. 8) is constituted including the partial pattern 19E2 and the partial pattern 72C3. When the individual capacitive coupling structures are described without distinguishing therebetween, the reference numeral 71 will be used, and when the individual capacitive coupling structures are described while distinguishing therebetween, the reference numerals 71AB, 71BC, 71CD, 71DE, 71AC, and 71CE will be used.

In the present embodiment, portions of the capacitive coupling structures 71 are constituted by the partial patterns 18B2, 18B3, 18D2, 18D3, 19A2, and 19E2 constituting portions of the capacitor electrodes 18 and 19 for the following reason. More specifically, when the height of the filter 10 is simply made shorter, a satisfactory Q-factor is not obtained. Specifically, in the case that the filter 10 is simply made shorter in height in a state in which the distance in the Z direction between the capacitor electrodes 18 and 19 and the capacitive coupling structures 71 is set to be relatively large, a satisfactory Q-factor cannot be obtained. In contrast to this feature, when the distance in the Z direction between the capacitor electrodes 18 and 19 and the capacitive coupling structures 71 is made relatively small, a satisfactory Q-factor can be obtained. Thus, according to the present embodiment, portions of the capacitive coupling structures 71 are constituted by the partial patterns 18B2, 18B3, 18D2, 18D3, 19A2, and 19E2 constituting portions of the capacitor electrodes 18. Specifically, according to the present embodiment, the distance in the Z direction between the capacitor electrodes 18 and 19 and the capacitive coupling structures 71 is set to zero.

As shown in FIG. 10 and FIG. 11, coupling capacitance electrodes (plate electrodes) 74A to 74E are formed inside the dielectric substrate 14. The coupling capacitance electrode 74A is connected to the via electrode portion 20A provided in the resonator 11A. The coupling capacitance electrode 74B is connected to the via electrode portion 20E provided in the resonator 11E. The coupling capacitance electrode 74C is connected to the via electrode portion 20B provided in the resonator 11B. The coupling capacitance electrode 74D is connected to the via electrode portion 20D provided in the resonator 11D. The coupling capacitance electrode 74E is connected to the via electrode portion 20C provided in the resonator 11C. The coupling capacitance electrodes 74A to 74E are formed in the same layer. Stated otherwise, the coupling capacitance electrodes 74A to 74E are formed on the same ceramic sheet (not shown). When the individual coupling capacitance electrodes are described without distinguishing therebetween, the reference numeral 74 will be used, and when the individual coupling capacitance electrodes are described while distinguishing therebetween, the reference numerals 74A to 74E will be used. One or more non-illustrated ceramic sheets exist between the coupling capacitance electrodes 74 and the coupling capacitance electrodes 72.

The coupling capacitance electrodes 74 are formed in point symmetry, with the center C of the dielectric substrate 14 as viewed in plan serving as the center of symmetry. The coupling capacitance electrode 74A and the coupling capacitance electrode 74B are formed in point symmetry, with the center C of the dielectric substrate 14 as viewed in plan serving as the center of symmetry. The coupling capacitance electrode 74C and the coupling capacitance electrode 74D are formed in point symmetry, with the center C of the dielectric substrate 14 as viewed in plan serving as the center of symmetry. The coupling capacitance electrode 74E is formed in point symmetry, with the center C of the dielectric substrate 14 as viewed in plan serving as the center of symmetry. In the present embodiment, the feature in which the coupling capacitance electrodes 74 are formed in point symmetry is in order to obtain satisfactory frequency characteristics.

As shown in FIG. 12 and FIG. 13, a coupling pattern 76 is formed within the dielectric substrate 14. The coupling pattern 76 is connected to the via electrode portion 20B that is provided in the resonator 11B, and the via electrode portion 20D that is provided in the resonator 11D. An opening 76*a* is formed in the coupling pattern 76. The via electrode portion 20C provided in the resonator 11C passes through the opening 76*a*. One or more non-illustrated ceramic sheets exist between the coupling pattern 76 and the coupling capacitance electrodes 74.

The coupling pattern 76 is formed in point symmetry, with the center C of the dielectric substrate 14 as viewed in plan serving as the center of symmetry. In the present embodiment, the feature in which the coupling pattern 76 is formed in point symmetry is in order to obtain satisfactory frequency characteristics.

As shown in FIG. 14 and FIG. 15, a coupling pattern 78 is formed within the dielectric substrate 14. The coupling pattern 78 is connected to the via electrode portion 20A that is provided in the resonator 11A, and the via electrode portion 20E that is provided in the resonator 11E. A portion of the coupling pattern 78 is positioned between the partial electrode portion 20Ca and the partial electrode portion 20Cb. One or more non-illustrated ceramic sheets exist between the coupling pattern 78 and the coupling pattern 76.

The coupling pattern 78 is formed in point symmetry, with the center C of the dielectric substrate 14 as viewed in plan serving as the center of symmetry. In the present embodiment, the feature in which the coupling pattern 78 is formed in point symmetry is in order to obtain satisfactory frequency characteristics.

As shown in FIG. 2, input/output patterns 80A and 80B are further formed within the dielectric substrate 14. The input/output patterns 80A and 80B are formed in the same layer. Stated otherwise, the input/output patterns 80A and 80B are formed on the same ceramic sheet (not shown). When the individual input/output patterns are described without distinguishing therebetween, the reference numeral 80 will be used, and when the individual input/output patterns are described while distinguishing therebetween, the reference numerals 80A and 80B will be used. One or more non-illustrated ceramic sheets exist between the coupling pattern 78 and the input/output patterns 80.

The input/output pattern 80A includes partial patterns 80A1 and 80A2. One end of the partial pattern 80A1 is connected to the input/output terminal 22A. Another end of the partial pattern 80A1 is connected to the partial pattern 80A2. The partial pattern 80A2 is connected to the via electrode portion 20A. In this manner, the input/output terminal 22A is connected to the via electrode portion 20A via the input/output pattern 80A.

The input/output pattern 80B includes partial patterns 80B1 and 80B2. One end of the partial pattern 80B1 is connected to the input/output terminal 22B. Another end of the partial pattern 80B1 is connected to the partial pattern 80B2. The partial pattern 80B2 is connected to the via electrode portion 20E. In this manner, the input/output terminal 22B is connected to the via electrode portion 20E via the input/output pattern 80B.

In this manner, the input/output terminal 22A is electrically connected to the via electrode portion 20A via the input/output pattern 80A, and the input/output terminal 22B is electrically connected to the via electrode portion 20E via the input/output pattern 80B. According to the present embodiment, an external Q-factor can be appropriately adjusted by appropriately setting the positions in the Z direction of the input/output patterns 80A and 80B. Specifically, according to the present embodiment, the external Q-factor can be appropriately adjusted by appropriately setting the positions of the input/output patterns 80A and 80B in the longitudinal direction of the via electrode portions 20A and 20D.

As shown in FIG. 9, shielding via electrode portions 81A and 81B are formed in the dielectric substrate 14. When the individual shielding via electrode portions are described without distinguishing therebetween, the reference numeral 81 will be used, and when the individual shielding via electrode portions are described while distinguishing therebetween, the reference numerals 81A and 81B will be used.

A shielding via electrode 82A and a shielding via electrode 82B are provided in the shielding via electrode portion 81A. A shielding via electrode 82C and a shielding via electrode 82D are provided in the shielding via electrode portion 81B. When the individual shielding via electrodes are described without distinguishing therebetween, the reference numeral 82 will be used, and when the individual shielding via electrodes are described while distinguishing therebetween, the reference numerals 82A to 82D will be used. In the example shown in FIG. 1, although one of the shielding via electrode portions 81 is provided with two of the shielding via electrodes 82, one of the shielding via electrode portions 81 may be constituted by one of the shielding via electrodes 82.

One end of each of the shielding via electrode portions 81 is connected to the shielding conductor 12A. Another end of each of the shielding via electrode portions 81 is connected to the shielding conductor 12B.

As shown in FIG. 11, the shielding via electrode portion 81A is connected to the shielding conductors 12A and 12B, within an extending region 84A in which the region in which the via electrode portion 20B is positioned is extended in the +Y direction. Specifically, the shielding via electrode portion 81A is connected to the shielding conductors 12A and 12B, within the extending region 84A in which the region in which the via electrode portion 20B is positioned is extended toward the shielding conductor 12Cb. In this manner, the shielding via electrode portion 81A is selectively formed within the extending region 84A. The shielding via electrode portion 81A is positioned in the vicinity of the shielding conductor 12Cb. Moreover, the region in which each of the via electrode portions 20 is positioned corresponds to a region of the imaginary circle 26.

The shielding via electrode portion 81B is connected to the shielding conductors 12A and 12B, within an extending region 84B in which the region in which the via electrode portion 20D is positioned is extended in the −Y direction. Specifically, the shielding via electrode portion 81B is connected to the shielding conductors 12A and 12B, within the extending region 84B in which the region in which the via electrode portion 20D is positioned is extended toward the shielding conductor 12Ca. The shielding via electrode portion 81B is selectively formed within the extending region 84B. The shielding via electrode portion 81B is positioned in the vicinity of the shielding conductor 12Ca. When the individual extending regions are described without distinguishing therebetween, the reference numeral 84 will be used, and when the individual extending regions are described while distinguishing therebetween, the reference numerals 84A and 84B will be used.

In the present embodiment, the shielding via electrode portions 81 are formed for the following reason. Specifically, when a positional shifting occurs in the case that the dielectric substrate 14 is cut, the distances between the via electrode portions 20 and the side surfaces 14*e* and 14*f* vary. When the distances between the via electrode portions 20 and the side surfaces 14*e* and 14*f* vary, the distances between the via electrode portions 20 and the shielding conductors 12Ca and 12Cb also vary. Such a variation in the distances between the via electrode portions 20 and the shielding conductors 12Ca and 12Cb brings about a variation in the filter characteristics and the like. On the other hand, since the shielding via electrode portions 81 are not formed on the side surfaces 14*e* and 14*f*, they do not receive an influence of any positional shifting that occurs when the dielectric substrate 14 is cut. Specifically, even in the case that a positional shifting occurs when the dielectric substrate 14 is cut, the distances between the shielding via electrode portions 81 and the via electrode portions 20 do not change. Due to such a reason, according to the present embodiment, the shielding via electrode portions 81 are formed.

In the present embodiment, the shielding via electrode portions 81 are selectively formed within the extending regions 84 for the following reason. Specifically, the shielding via electrode portions 81 can be formed by forming the via holes by irradiating the dielectric substrate 14 with a laser beam, and then by filling the via holes with a conductor. In particular, a certain amount of man-hours are required in order to form the shielding via electrode portions 81. For this reason, when a large number of the shielding via electrode portions 81 are simply arranged along the side surfaces 14*e* and 14*f*, satisfactory productivity cannot be obtained. On the other hand, by simply arranging the shielding via electrode portions 81 only in the extending regions 84, it is possible to suppress variations in the filter characteristics and the like caused by the occurrence of positional shifting when the dielectric substrate 14 is cut. Due to such a reason, according to the present embodiment, the shielding via electrode portions 81 are selectively formed within the extending regions 84.

In this manner, according to the present embodiment, the capacitive coupling structures 71 are constituted by the partial patterns 18B2, 18B3, 18D2, and 18D3 constituting portions of the capacitor electrodes 18. Therefore, according to the present embodiment, the distance in the Z direction between the capacitor electrodes 18 and the capacitive coupling structures 71 is set to be sufficiently small. Therefore, according to the present embodiment, it is possible to achieve a reduction in height while suppressing a deterioration of the Q-factor. According to the present embodiment, it is possible to provide the filter 10 that can achieve a reduction in height while suppressing deterioration of the filter characteristics.

Second Embodiment

Figure 17:
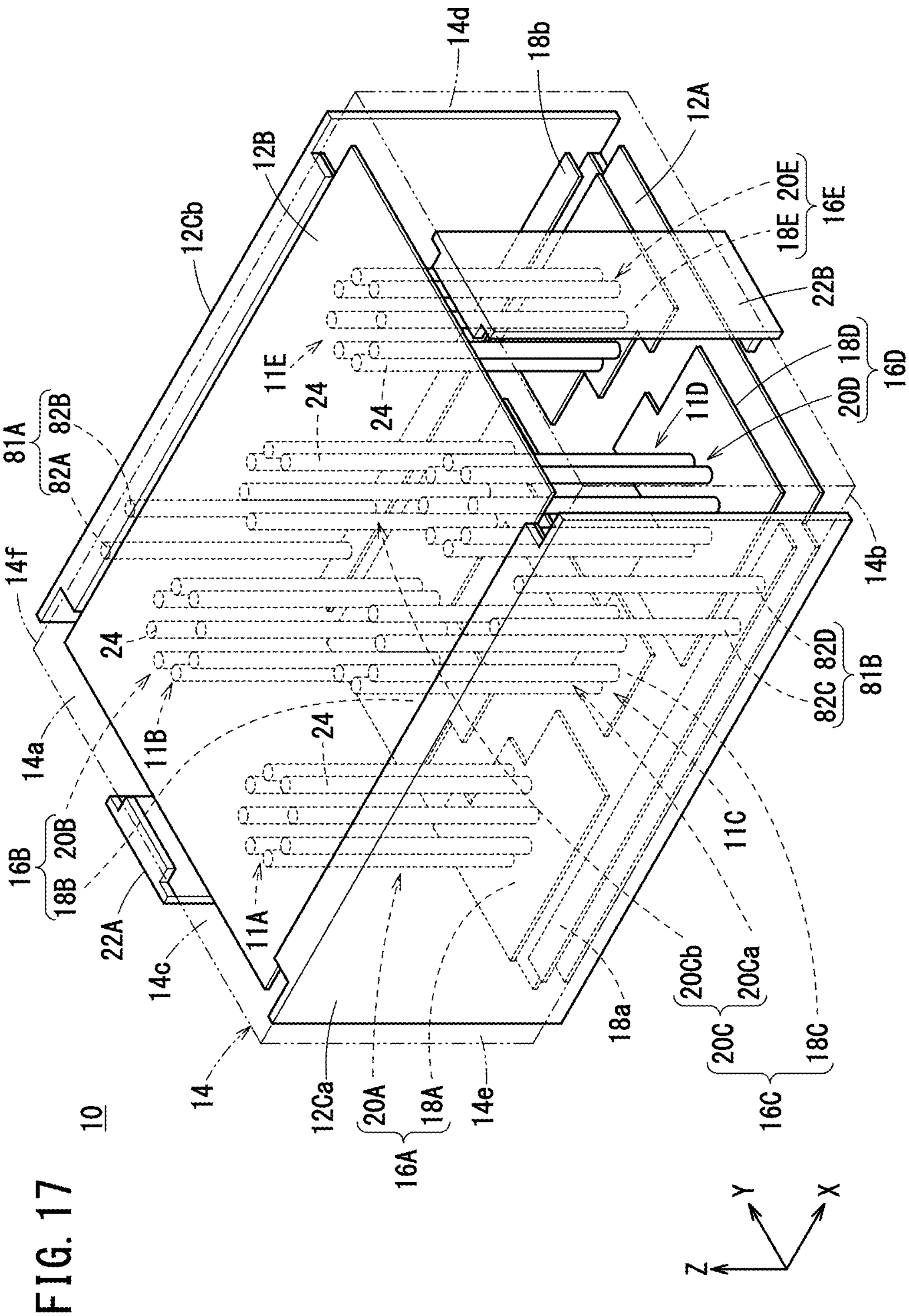
FIG. 17 is a perspective view showing the filter according to a second embodiment.
Figure 18:
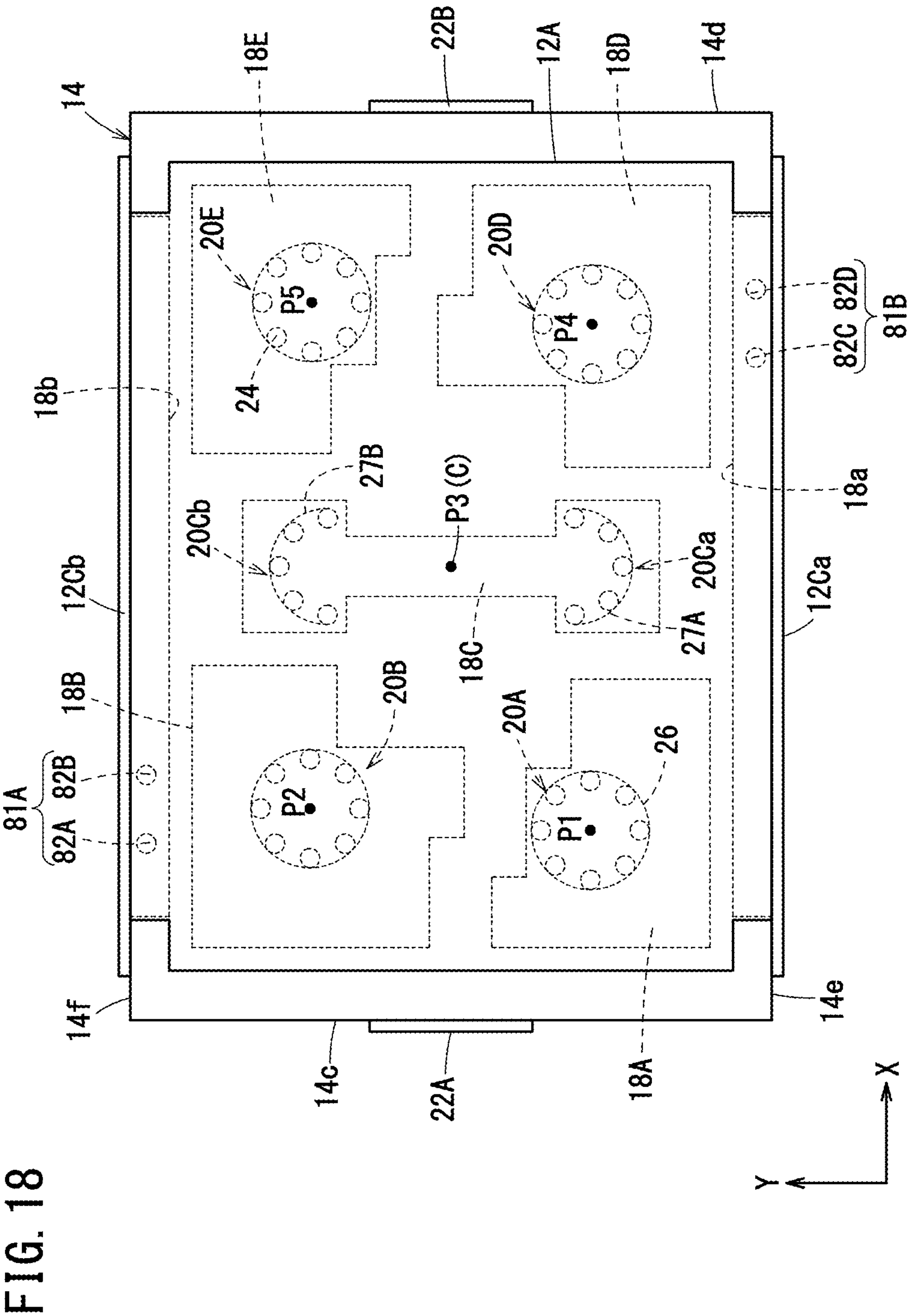
FIG. 18 is a plan view showing the filter according to the second embodiment.
Figure 19A:
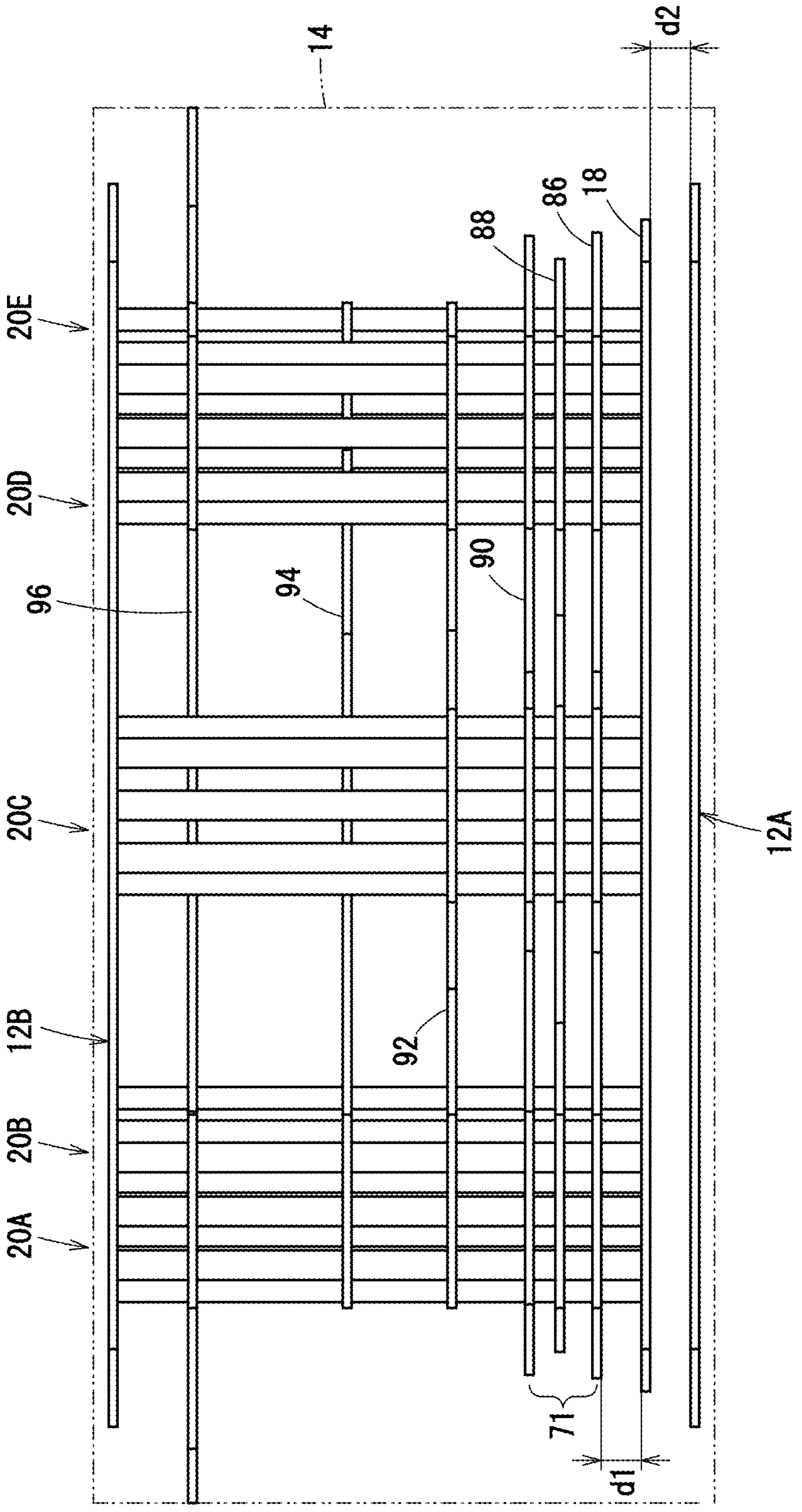
FIG. 19A is a cross-sectional view showing a portion of the filter according to the second embodiment.
Figure 19B:
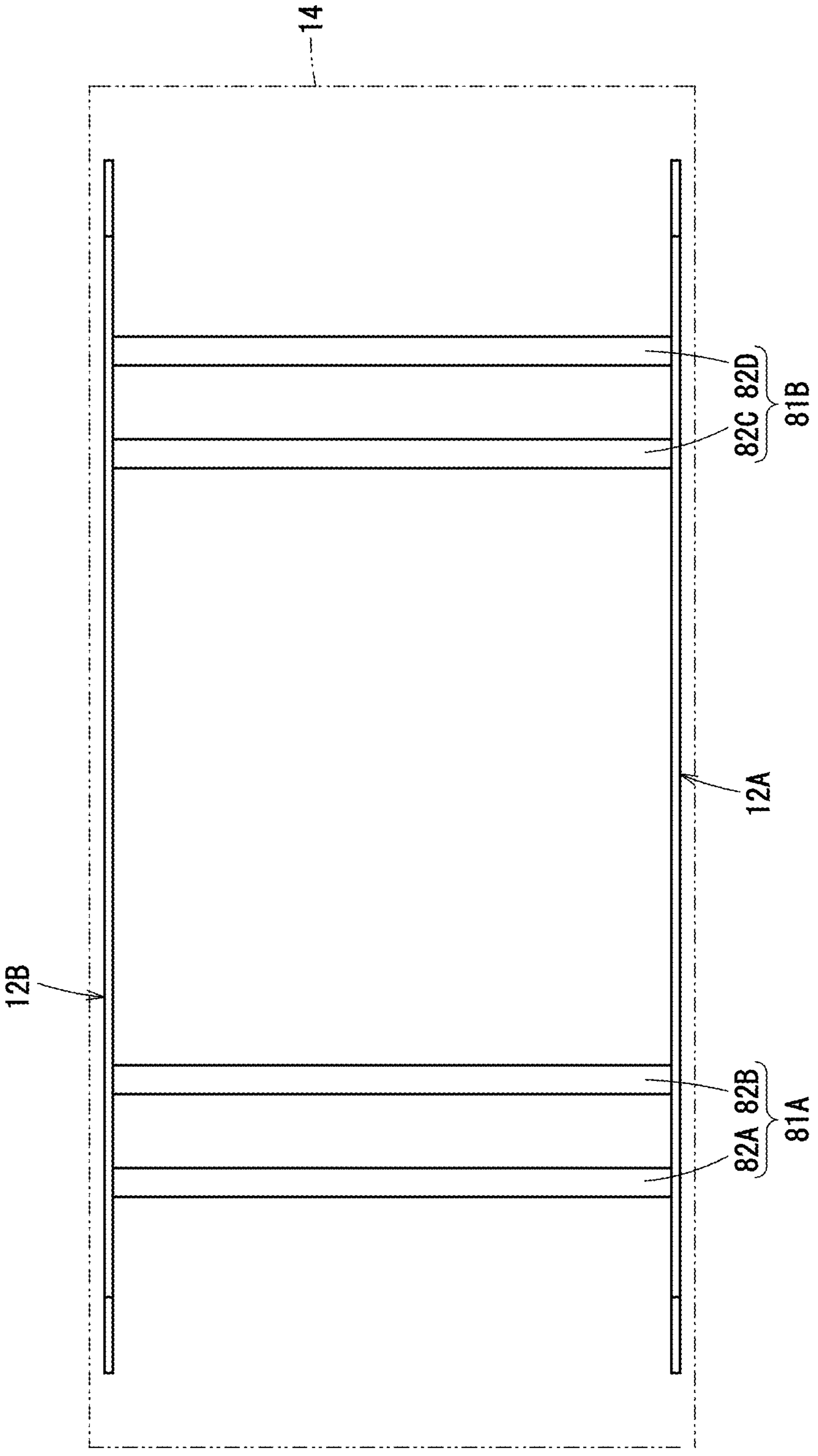
FIG. 19B is a cross-sectional view showing a portion of the filter according to the second embodiment.
Figure 20:
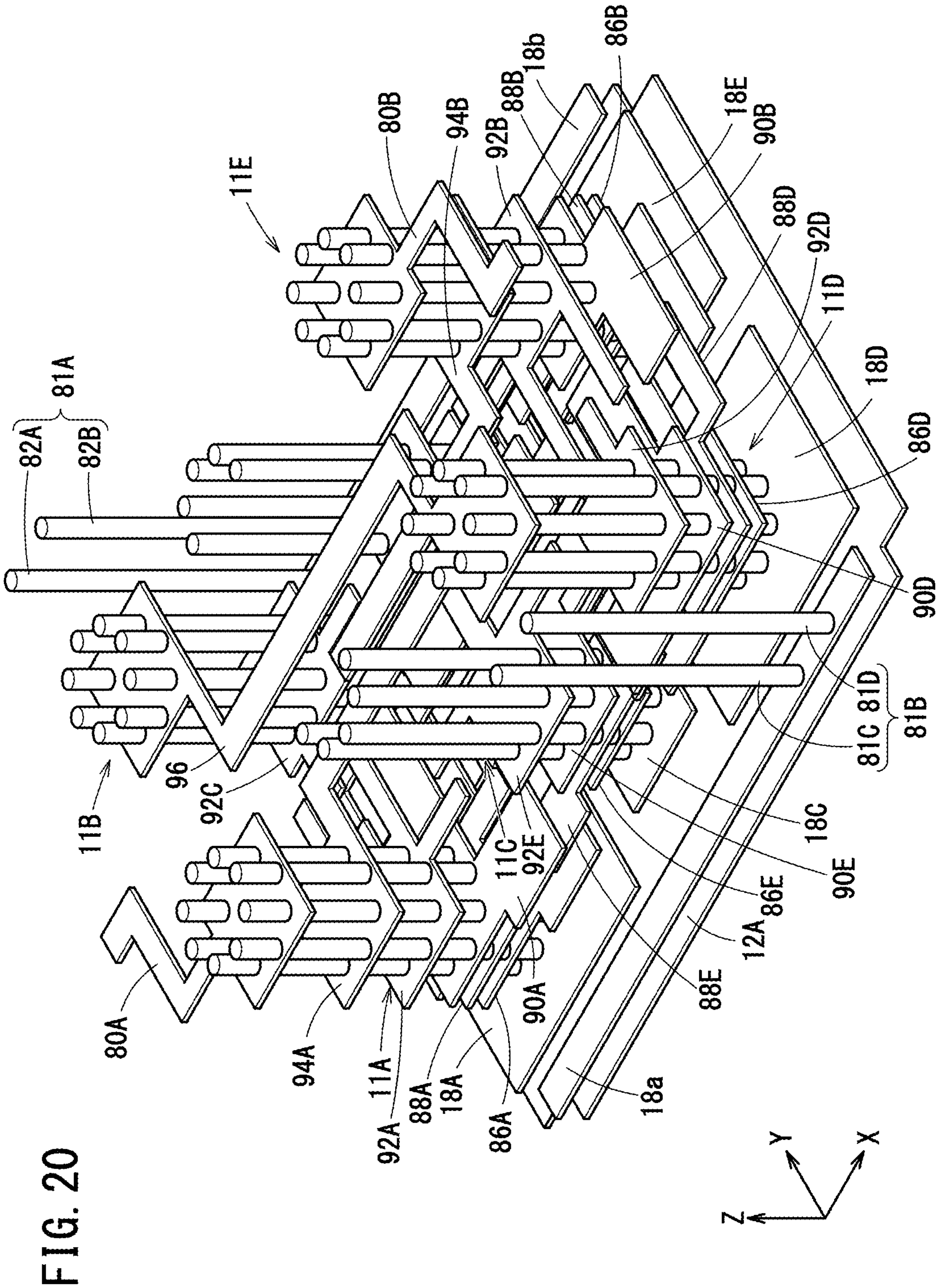
FIG. 20 is a perspective view showing the filter according to the second embodiment.
Figure 21:
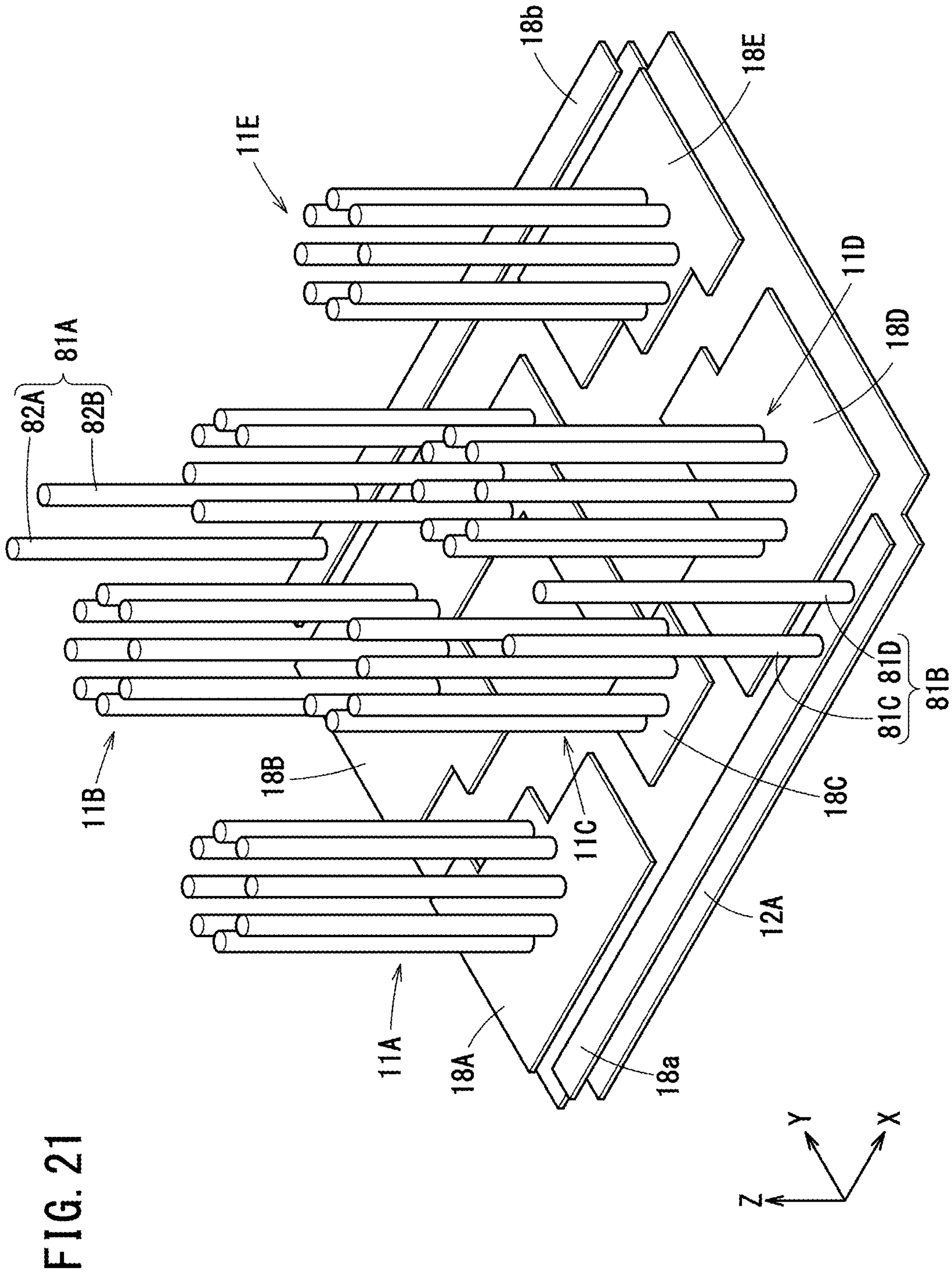
FIG. 21 is a perspective view showing the filter according to the second embodiment.
Figure 22:
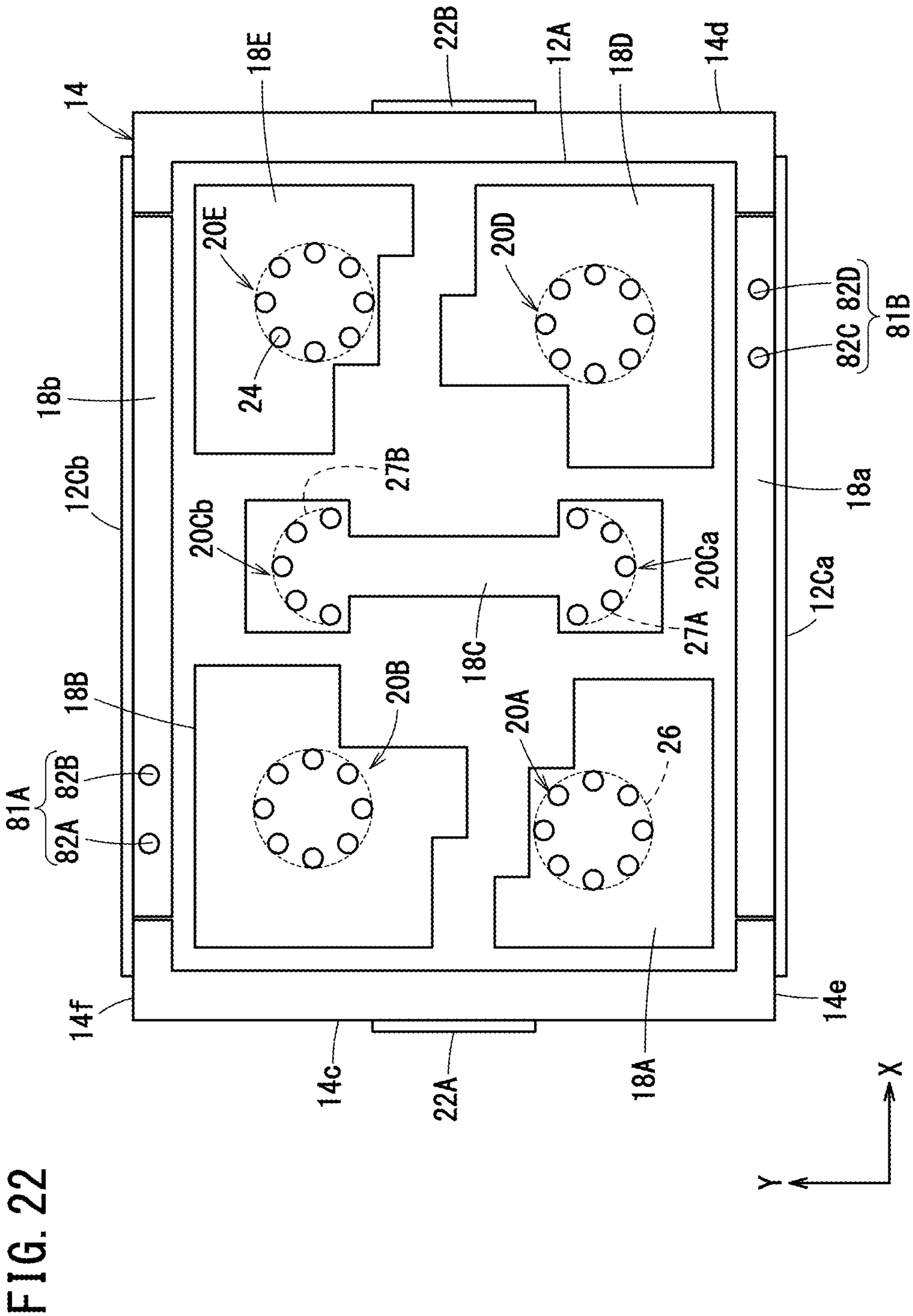
FIG. 22 is a plan view showing the filter according to the second embodiment.
Figure 23:
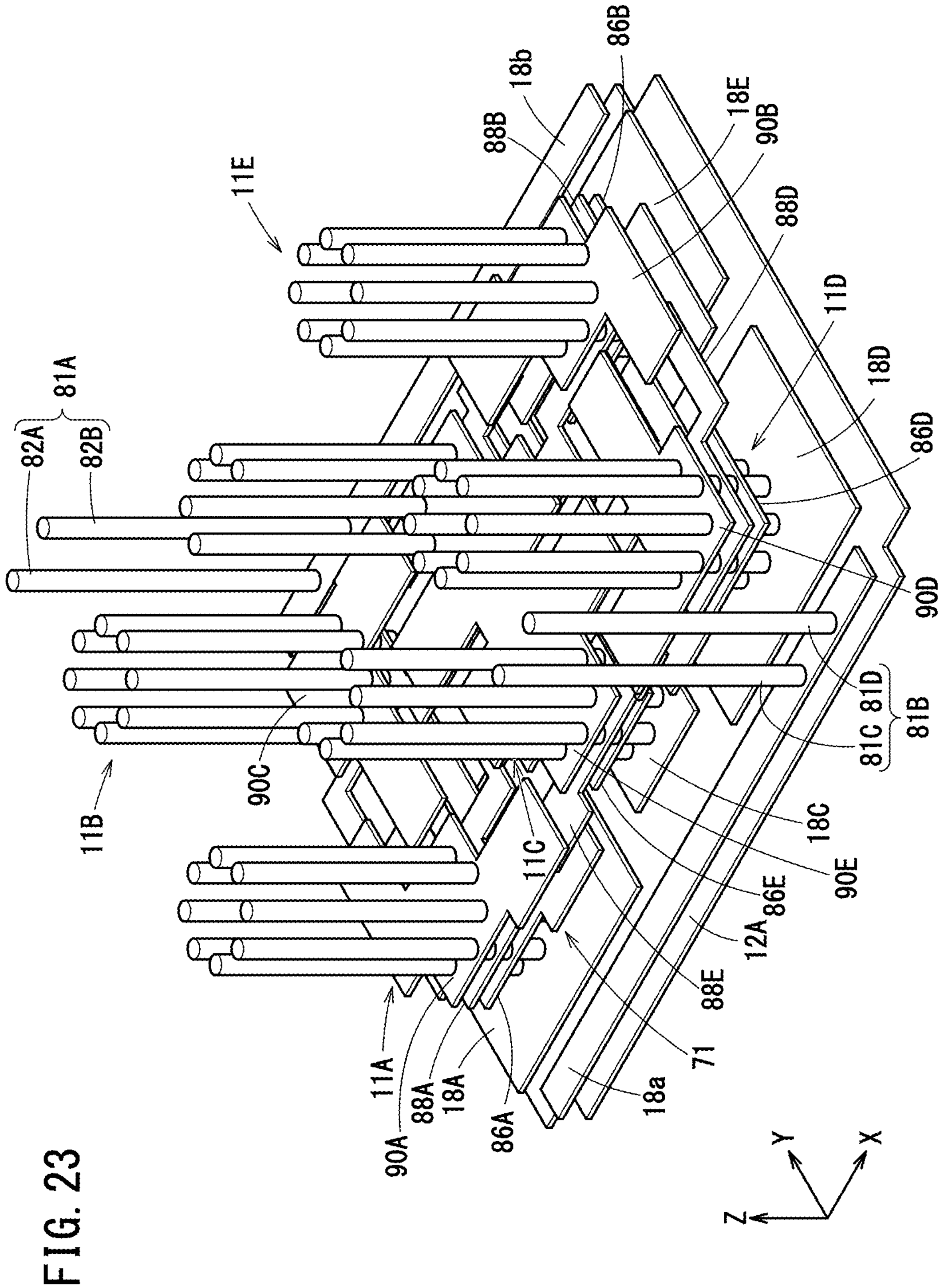
FIG. 23 is a perspective view showing the filter according to the second embodiment.
Figure 24:
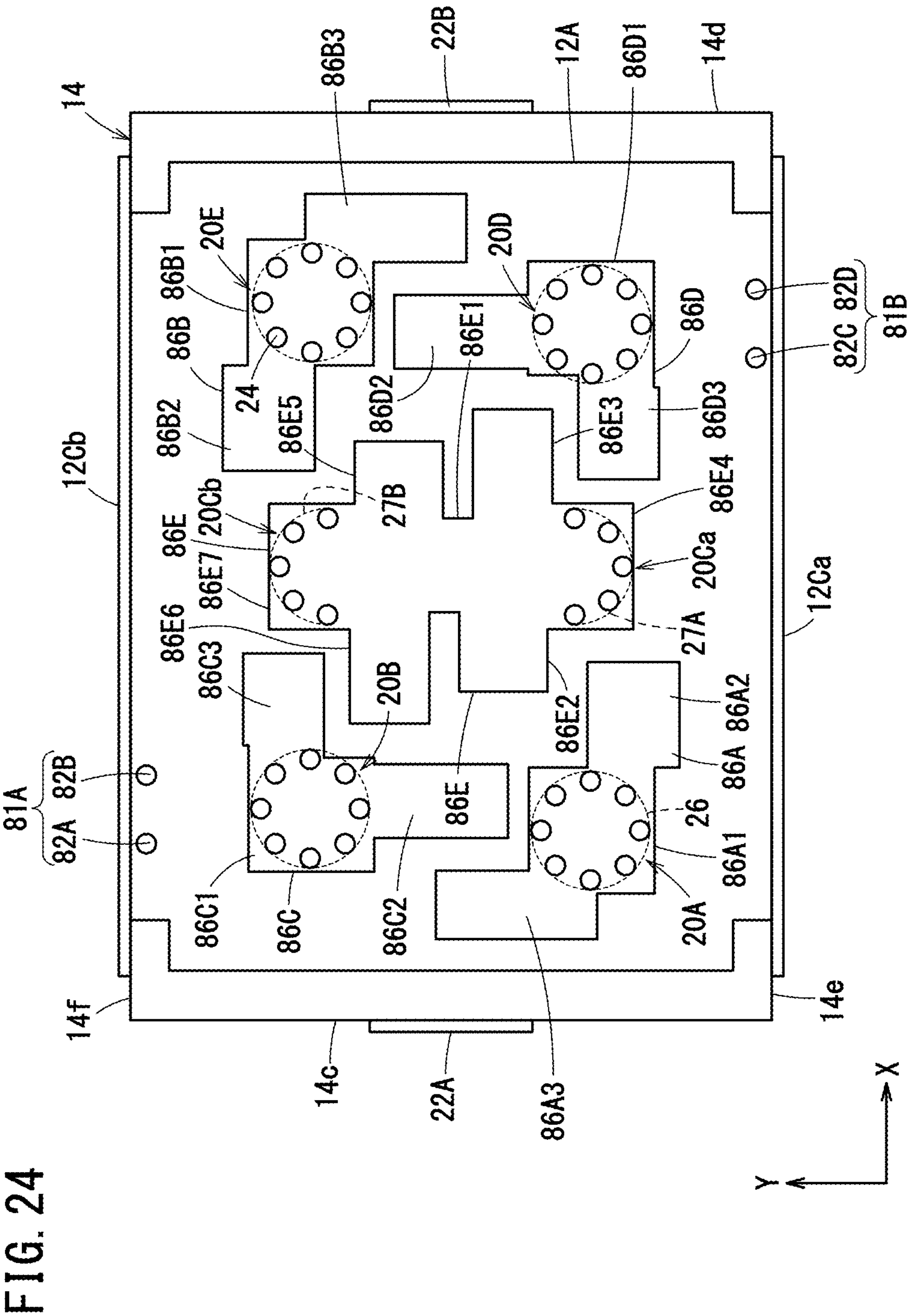
FIG. 24 is a plan view showing the filter according to the second embodiment.
Figure 25:
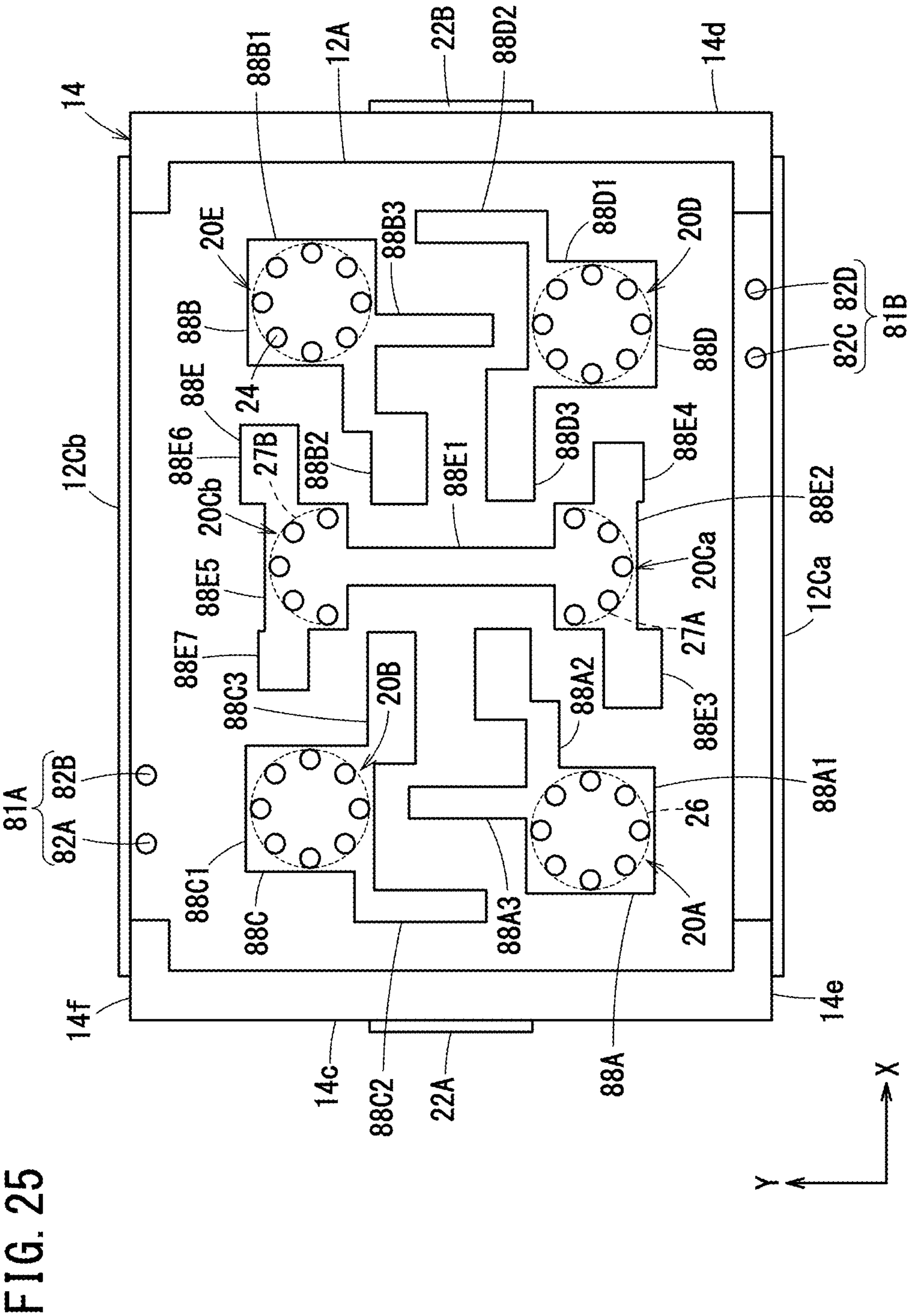
FIG. 25 is a plan view showing the filter according to the second embodiment.
Figure 26:
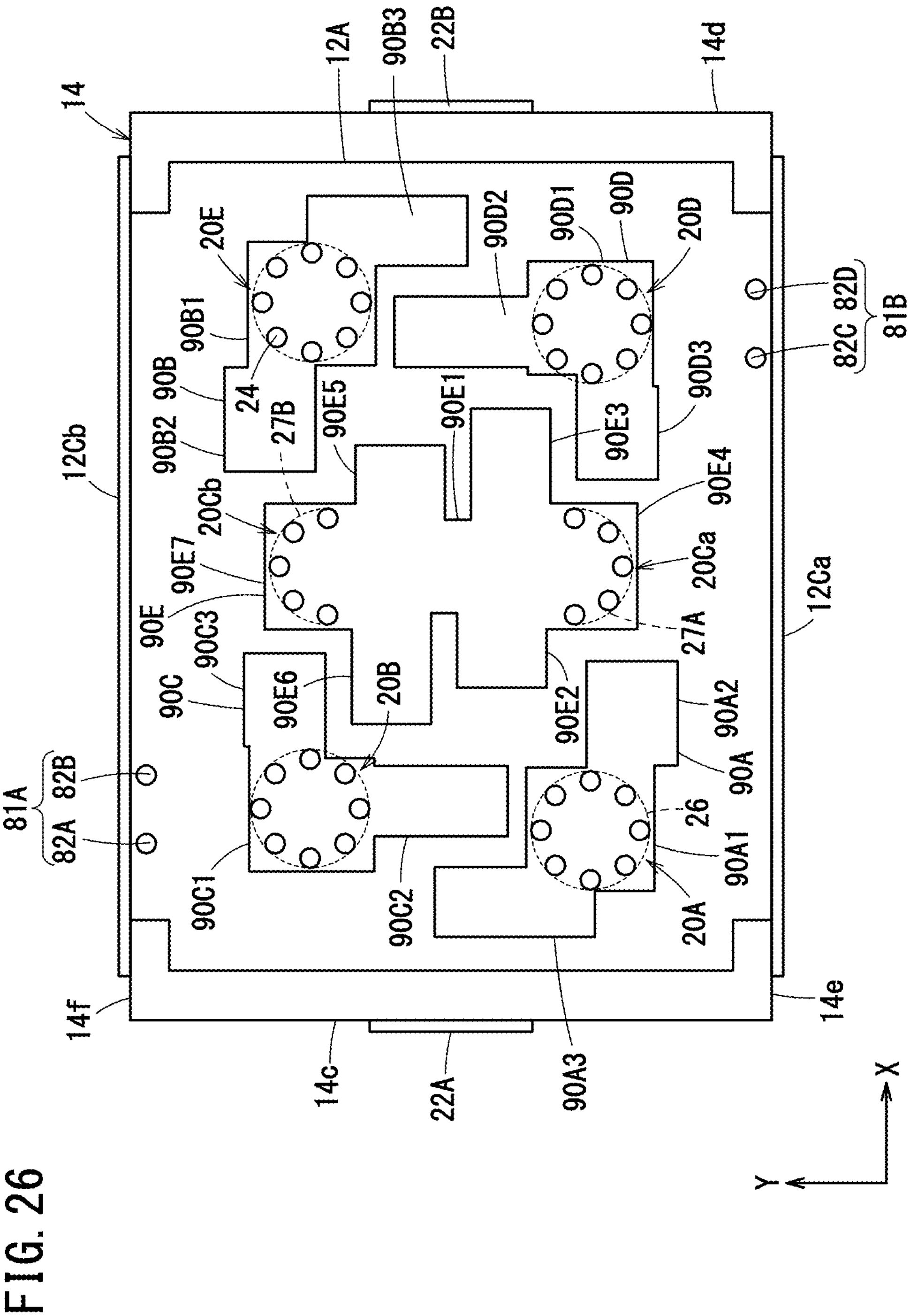
FIG. 26 is a plan view showing the filter according to the second embodiment.
Figure 27:
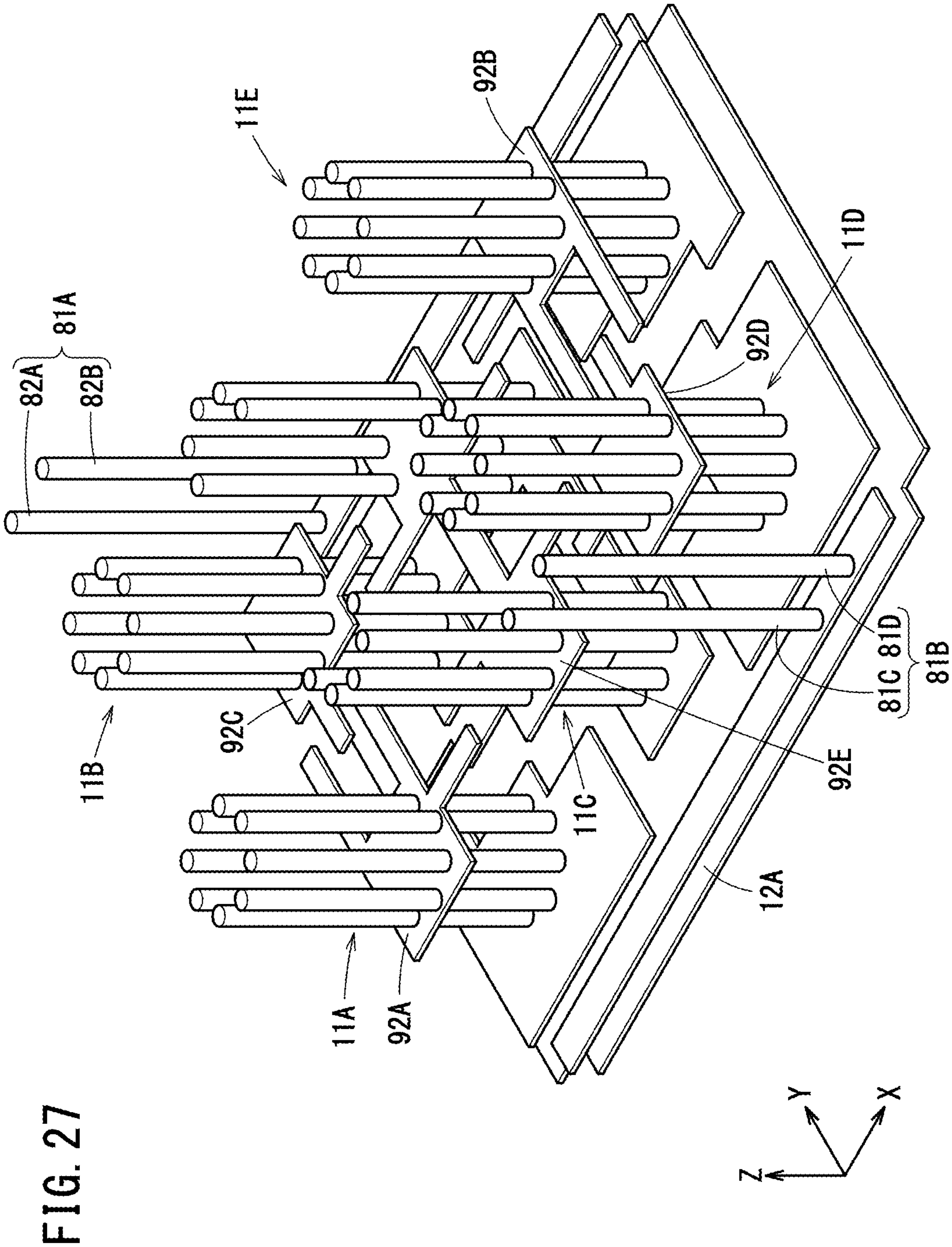
FIG. 27 is a perspective view showing the filter according to the second embodiment.
Figure 28:
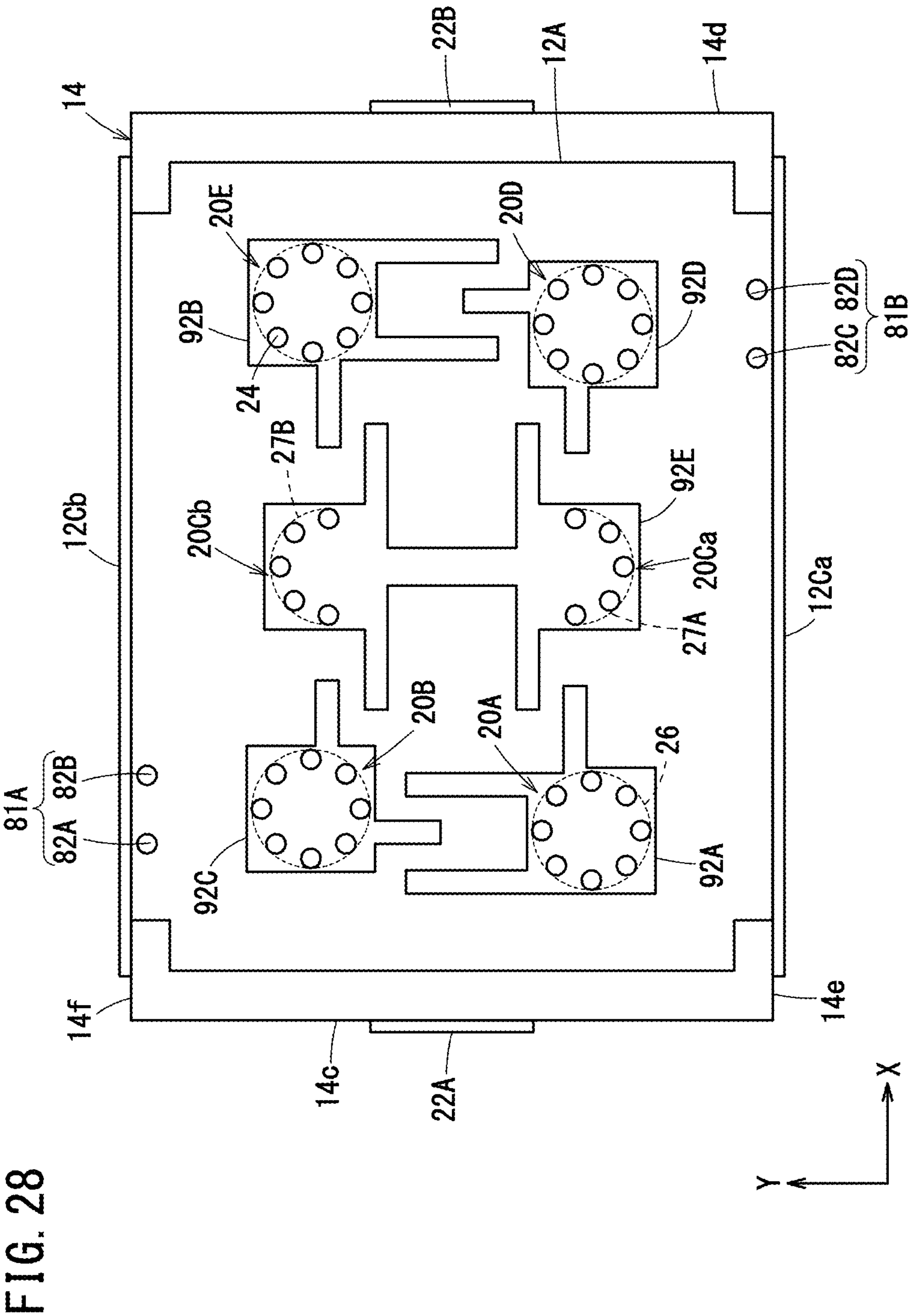
FIG. 28 is a plan view showing the filter according to the second embodiment.
Figure 29:
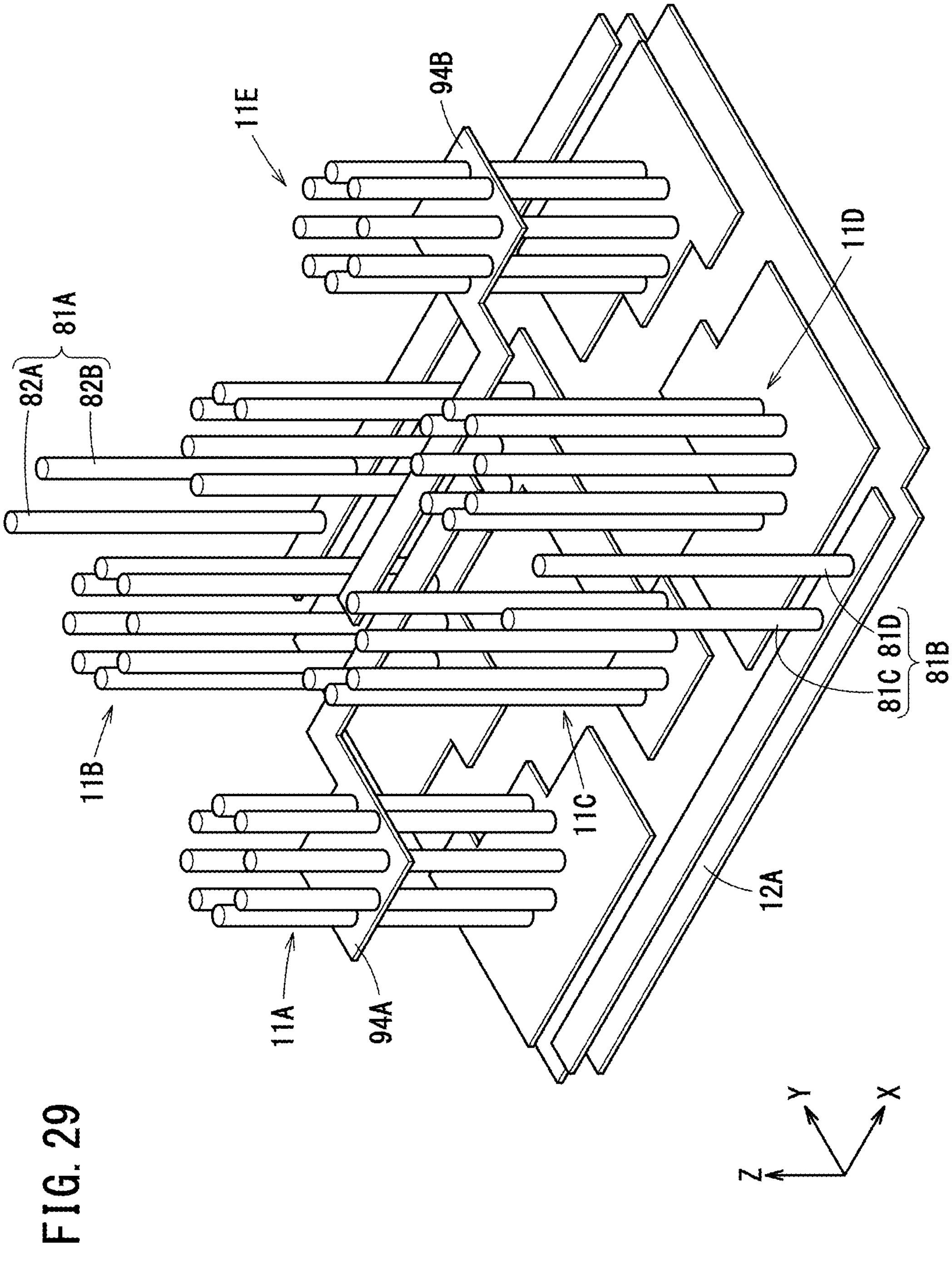
FIG. 29 is a perspective view showing the filter according to the second embodiment.
Figure 30:
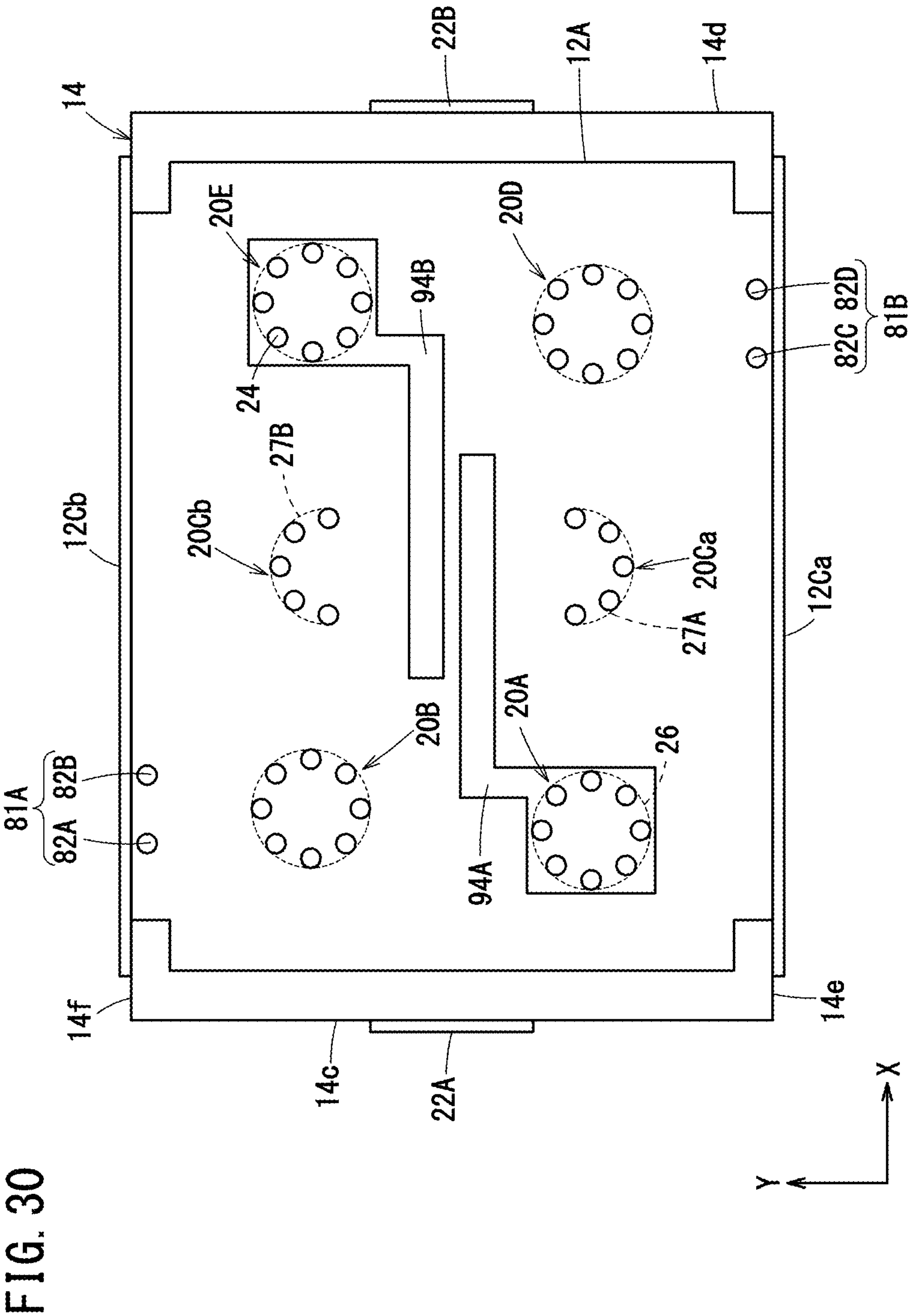
FIG. 30 is a plan view showing the filter according to the second embodiment.
Figure 31:
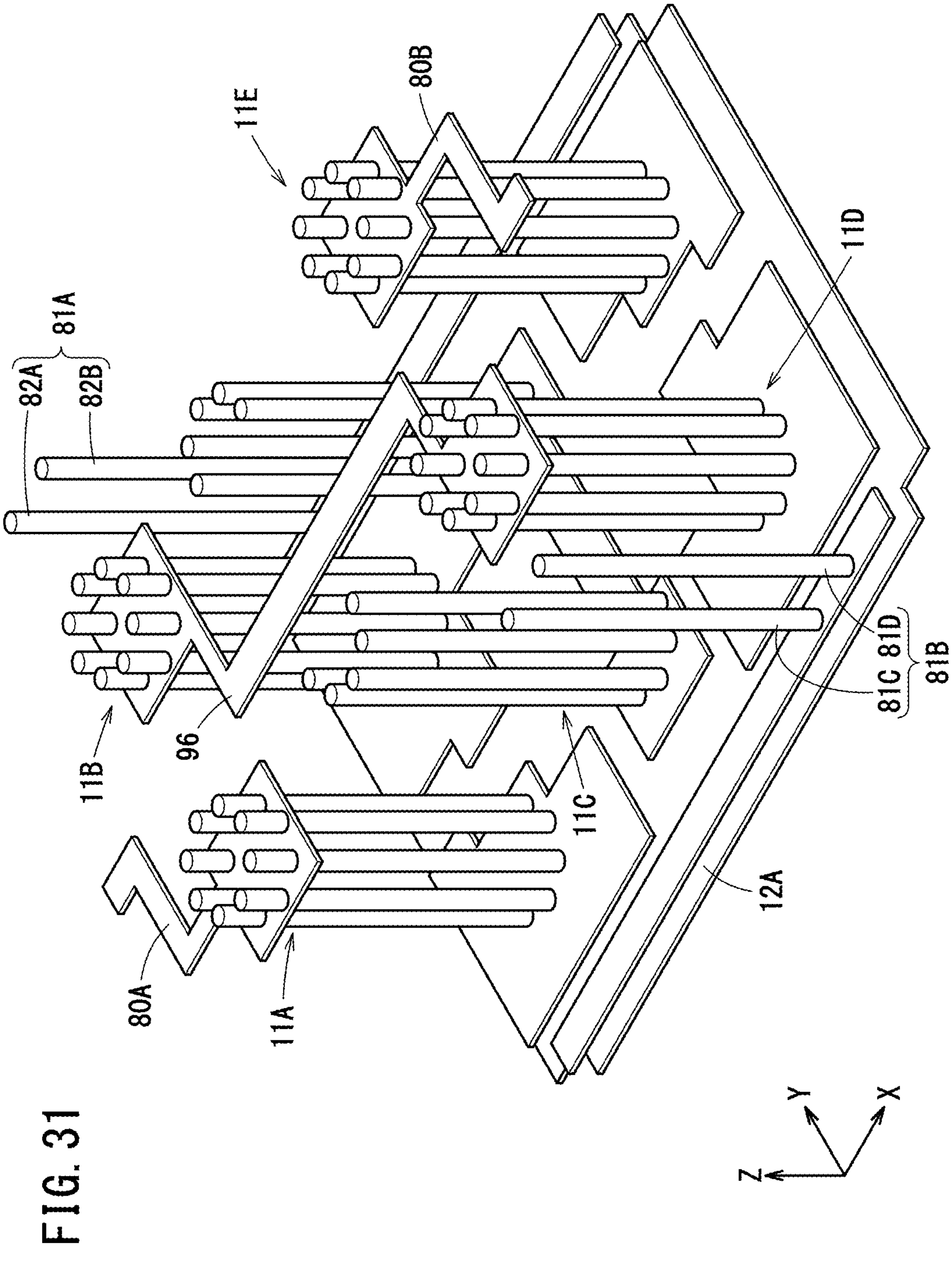
FIG. 31 is a perspective view showing the filter according to the second embodiment.
Figure 32:
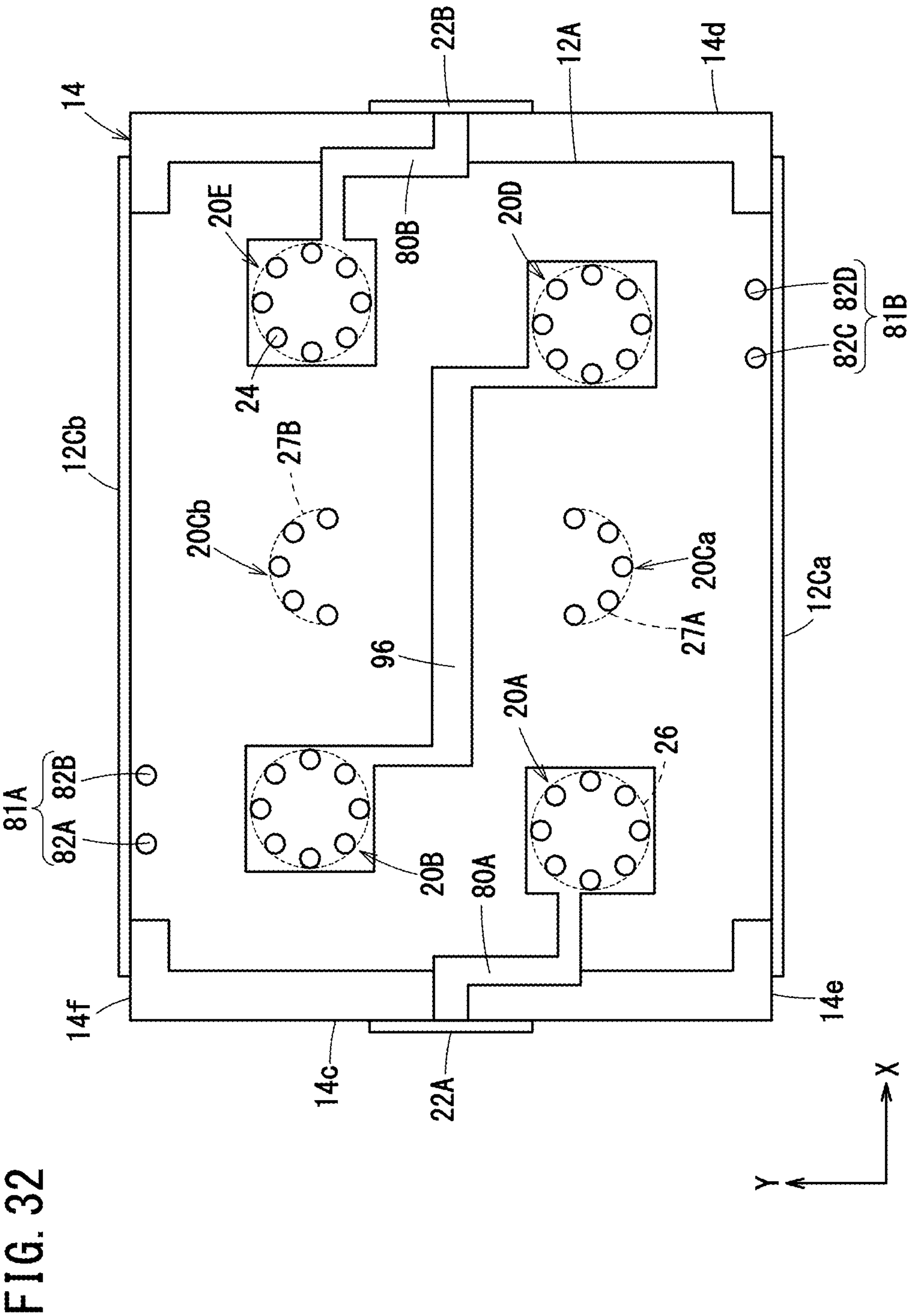
FIG. 32 is a plan view showing the filter according to the second embodiment.
Figure 33:
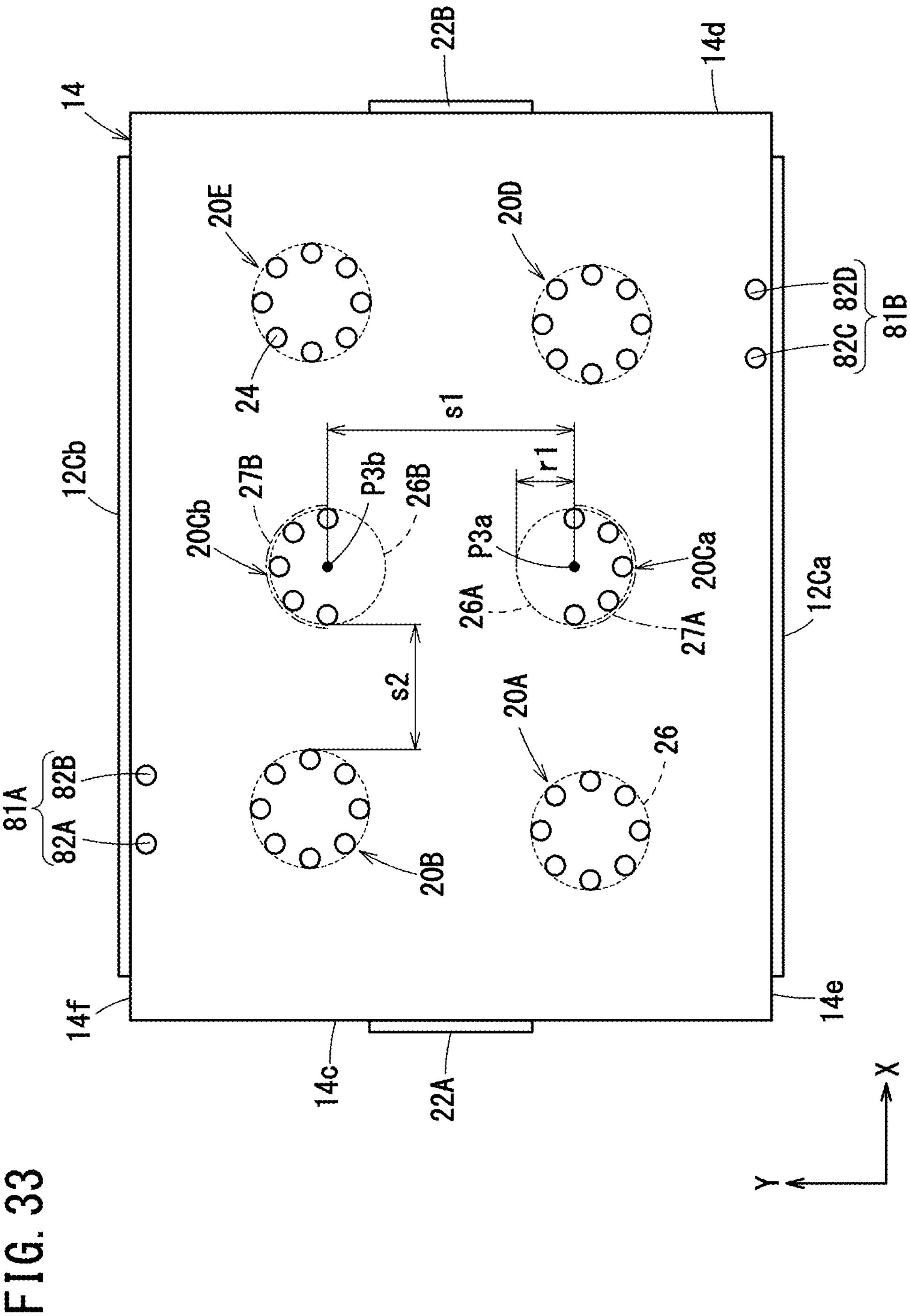
FIG. 33 is a plan view showing the filter according to the second embodiment.

A filter according to a second embodiment will be described with reference to FIG. 17 to FIG. 33. FIG. 17 is a perspective view showing the filter according to the present embodiment. FIG. 18 is a plan view showing the filter according to the present embodiment. FIG. 19A and FIG. 19B are cross-sectional views showing portions of the filter according to the present embodiment. FIG. 20 and FIG. 21 are perspective views showing the filter according to the present embodiment. FIG. 22 is a plan view showing the filter according to the present embodiment. FIG. 23 is a perspective view showing the filter according to the present embodiment. FIG. 24 to FIG. 26 are plan views showing the filter according to the present embodiment. FIG. 27 is a perspective view showing the filter according to the present embodiment. FIG. 28 is a plan view showing the filter according to the present embodiment. FIG. 29 is a perspective view showing the filter according to the present embodiment. FIG. 30 is a plan view showing the filter according to the present embodiment. FIG. 31 is a perspective view showing the filter according to the present embodiment. FIG. 32 and FIG. 33 are plan views showing the filter according to the present embodiment. For the sake of simplicity, a portion of each of the constituent elements has been appropriately omitted from FIG. 17 to FIG. 33. The same constituent elements as those in the filter according to the first embodiment shown in FIG. 1 to FIG. 16 are denoted by the same reference numerals, and description of such features will be omitted or simplified.

As shown in FIG. 17, within the dielectric substrate 14, capacitor electrodes (strip lines) 18A to 18E are formed that face toward the shielding conductor 12A. The capacitor electrodes 18A to 18E are formed in the same layer. Stated otherwise, the capacitor electrodes 18A to 18E are formed on the same ceramic sheet (not shown). Moreover, when the individual capacitor electrodes are described without distinguishing therebetween, the reference numeral 18 will be used, and when the individual capacitor electrodes are described while distinguishing therebetween, the reference numerals 18A to 18E will be used.

The capacitor electrodes 18 are formed in point symmetry, with the center C of the dielectric substrate 14 as viewed in plan serving as the center of symmetry. The capacitor electrode 18A and the capacitor electrode 18E are formed in point symmetry, with the center C of the dielectric substrate 14 as viewed in plan serving as the center of symmetry. The capacitor electrode 18B and the capacitor electrode 18D are formed in point symmetry, with the center C of the dielectric substrate 14 as viewed in plan serving as the center of symmetry. The capacitor electrode 18C is formed in point symmetry, with the center C of the dielectric substrate 14 as viewed in plan serving as the center of symmetry. In the present embodiment, the feature in which the capacitor electrodes 18 are formed in point symmetry is in order to obtain satisfactory frequency characteristics.

The capacitor electrode 18A is connected to the via electrode portion 20A. The capacitor electrode 18B is connected to the via electrode portion 20B. The capacitor electrode 18C is connected to the via electrode portion 20C.

The capacitor electrode 18D is connected to a via electrode portion 20D. The capacitor electrode 18E is connected to a via electrode portion 20E.

Further formed inside the dielectric substrate 14 are an electrode pattern 18*a* connected to the shielding conductor 12Ca, and an electrode pattern 18*b* connected to the shielding conductor 12Cb.

As shown in FIG. 18, the via electrodes 24 that make up the via electrode portions 20A, 20B, 20D, and 20E, in the same manner as in the first embodiment, are each arranged along an imaginary circle 26 as viewed in plan.

The via electrode portion 20C, similar to the first embodiment, is divided into a partial electrode portion 20Ca and a partial electrode portion 20Cb. In the present embodiment, the partial electrode portion 20Ca and the partial electrode portion 20Cb are largely spaced apart from each other in the Y direction. In the present embodiment, the distance s1 (refer to FIG. 33) between the center P3*a* of the imaginary circle 26A and the center P3*b* of the imaginary circle 26B may be set, for example, to 1.2 mm, although the present embodiment is not limited to this feature. Although not limited to this feature, the radius r1 of the imaginary circle 26 may be set, for example, to 0.29 mm. Stated otherwise, although not limited to this feature, the diameter of the imaginary circle 26 may be set to 0.58 mm. A gap s2 in the X direction between the imaginary circle 26 corresponding to the via electrode portion 20B, and the imaginary circle 26 corresponding to the via electrode portion 20C can be set, for example, to 0.62 mm, although the present embodiment is not limited to this feature. A distance s1 between the center P3*a* of the imaginary circle 26A and the center P3*b* of the imaginary circle 26B is preferably greater than or equal to 0.7 times the radius r1 of the imaginary circles 26A and 26B. In the present embodiment, the distance s1 between the center P3*a* of the imaginary circle 26A and the center P3*b* of the imaginary circle 26B is set to be 4.138 times the radius r1 of the imaginary circles 26A and 26B.

In the present embodiment, the partial electrode portion 20Ca and the partial electrode portion 20Cb are largely spaced apart from each other in the Y direction. Therefore, in the present embodiment, the distance between the partial electrode portion 20Ca and the shielding conductor 12Ca becomes sufficiently short, and the distance between the partial electrode portion 20Cb and the shielding conductor 12Cb also becomes sufficiently short. When the distance between the partial electrode portion 20Ca and the shielding conductor 12Ca becomes sufficiently short, the coupling capacitance between the partial electrode portion 20Ca and the shielding conductor 12Ca sufficiently increases. When the distance between the partial electrode portion 20Cb and the shielding conductor 12Cb becomes sufficiently short, the coupling capacitance between the partial electrode portion 20Cb and the shielding conductor 12Cb sufficiently increases. Upon doing so, even in the case that the length of the via electrode portion 20C has become shorter, sufficiently good electrical characteristics can be obtained.

In this manner, in the present embodiment, in the resonator 11C, the via electrode portion 20C is divided into the partial electrode portion 20Ca and the partial electrode portion 20Cb, and the partial electrode portion 20Ca and the partial electrode portion 20Cb are largely spaced apart from each other in the Y direction. On the other hand, the resonators 11A, 11B, 11D, and 11E, except for the resonator 11C, each include one undivided via electrode portion 20A, 20B, 20D, and 20E.

As shown in FIG. 23 and FIG. 24, coupling capacitance electrodes (plate electrodes) 86A to 86E are formed within the dielectric substrate 14. The coupling capacitance electrode 86A is connected to the via electrode portion 20A provided in the resonator 11A. The coupling capacitance electrode 86B is connected to the via electrode portion 20E provided in the resonator 11E. The coupling capacitance electrode 86C is connected to the via electrode portion 20B provided in the resonator 11B. The coupling capacitance electrode 86D is connected to the via electrode portion 20D provided in the resonator 11D. The coupling capacitance electrode 86E is connected to the via electrode portion 20C provided in the resonator 11C. The coupling capacitance electrodes 86A to 86E are formed in the same layer. Stated otherwise, the coupling capacitance electrodes 86A to 86E are formed on the same ceramic sheet (not shown). When the individual coupling capacitance electrodes are described without distinguishing therebetween, the reference numeral 86 will be used, and when the individual coupling capacitance electrodes are described while distinguishing therebetween, the reference numerals 86A to 86E will be used. One or more non-illustrated ceramic sheets exist between coupling capacitance electrodes 86 and the capacitor electrodes 18.

The coupling capacitance electrodes 86 are formed in point symmetry, with the center C of the dielectric substrate 14 as viewed in plan serving as the center of symmetry. The coupling capacitance electrode 86A and the coupling capacitance electrode 86B are formed in point symmetry, with the center C of the dielectric substrate 14 as viewed in plan serving as the center of symmetry. The coupling capacitance electrode 86C and the coupling capacitance electrode 86D are formed in point symmetry, with the center C of the dielectric substrate 14 as viewed in plan serving as the center of symmetry. The coupling capacitance electrode 86E is also formed in point symmetry, with the center C of the dielectric substrate 14 as viewed in plan serving as the center of symmetry. In the present embodiment, the feature in which the coupling capacitance electrodes 86 are formed in point symmetry is in order to obtain satisfactory frequency characteristics.

As shown in FIG. 24, the coupling capacitance electrode 86A includes partial patterns (electrode patterns) 86A1 to 86A3. The partial pattern 86A1 is connected to the via electrode portion 20A. One end of the partial pattern 86A2 is connected to the partial pattern 86A1. The partial pattern 86A2 projects out in the +X direction. One end of the partial pattern 86A3 is connected to the partial pattern 86A1. The partial pattern 86A3 projects out in the +Y direction.

The coupling capacitance electrode 86B includes partial patterns (electrode patterns) 86B1 to 86B3. The partial pattern 86B1 is connected to the via electrode portion 20E. One end of the partial pattern 86B2 is connected to the partial pattern 86B1. The partial pattern 86B2 projects out in the −X direction. One end of the partial pattern 86B3 is connected to the partial pattern 86B1. The partial pattern 86B3 projects out in the −Y direction.

The coupling capacitance electrode 86C includes partial patterns 86C1 to 86C3. The partial pattern 86C1 is connected to the via electrode portion 20B. One end of the partial pattern 86C2 is connected to the partial pattern 86C1. The partial pattern 8602 projects out in the −Y direction. One end of the partial pattern 86C3 is connected to the partial pattern 86C1. The partial pattern 86C3 projects out in the +X direction.

The coupling capacitance electrode 86D includes partial patterns (electrode patterns) 86D1 to 86D3. The partial pattern 86D1 is connected to the via electrode portion 20D. One end of the partial pattern 86D2 is connected to the partial pattern 86D1. The partial pattern 8602 projects out in the +Y direction. One end of the partial pattern 86D3 is connected to the partial pattern 86D1. The partial pattern 86D3 projects out in the −X direction.

The coupling capacitance electrode 86E includes partial patterns (electrode patterns) 86E1 to 86E7. The partial pattern 86E1 is positioned at the center C of the dielectric substrate 14 as viewed in plan. The partial patterns 86E2 and 86E3 are connected to the partial pattern 86E1. The partial pattern 86E2 projects out in the −X direction. The partial pattern 86E3 projects out in the +X direction. The partial pattern 86E4 is connected to the partial patterns 86E2 and 86E3. The partial pattern 86E4 projects out in the −Y direction. The partial pattern 86E4 is connected to the partial electrode portion 20Ca. The partial patterns 86E5 and 86E6 are connected to the partial pattern 86E1. The partial pattern 86E5 projects out in the +X direction. The partial pattern 86E6 projects out in the −X direction. The partial pattern 86E7 is connected to the partial patterns 86E5 and 86E6. The partial pattern 86E7 projects out in the +Y direction. The partial pattern 86E7 is connected to the partial electrode portion 20Cb.

As shown in FIG. 23 and FIG. 25, coupling capacitance electrodes (plate electrodes) 88A to 88E are formed within the dielectric substrate 14. The coupling capacitance electrode 88A is connected to the via electrode portion 20A provided in the resonator 11A. The coupling capacitance electrode 88B is connected to the via electrode portion 20E provided in the resonator 11E. The coupling capacitance electrode 88C is connected to the via electrode portion 20B provided in the resonator 11B. The coupling capacitance electrode 88D is connected to the via electrode portion 20D provided in the resonator 11D. The coupling capacitance electrode 88E is connected to the via electrode portion 20C provided in the resonator 11C. The coupling capacitance electrodes 88A to 88E are formed in the same layer. Stated otherwise, the coupling capacitance electrodes 88A to 88E are formed on the same ceramic sheet (not shown). When the individual coupling capacitance electrodes are described without distinguishing therebetween, the reference numeral 88 will be used, and when the individual coupling capacitance electrodes are described while distinguishing therebetween, the reference numerals 88A to 88E will be used. One or more non-illustrated ceramic sheets exist between the coupling capacitance electrodes 88 and the coupling capacitance electrodes 86.

The coupling capacitance electrodes 88 are formed in point symmetry, with the center C of the dielectric substrate 14 as viewed in plan serving as the center of symmetry. The coupling capacitance electrode 88A and the coupling capacitance electrode 88B are formed in point symmetry, with the center C of the dielectric substrate 14 as viewed in plan serving as the center of symmetry. The coupling capacitance electrode 88C and the coupling capacitance electrode 88D are formed in point symmetry, with the center C of the dielectric substrate 14 as viewed in plan serving as the center of symmetry. The coupling capacitance electrode 88E is also formed in point symmetry, with the center C of the dielectric substrate 14 as viewed in plan serving as the center of symmetry. In the present embodiment, the feature in which the coupling capacitance electrodes 88 are formed in point symmetry is in order to obtain satisfactory frequency characteristics.

As shown in FIG. 25, the coupling capacitance electrode 88A includes partial patterns (electrode patterns) 88A1 to 88A3. The partial pattern 88A1 is connected to the via electrode portion 20A. One end of the partial pattern 88A2 is connected to the partial pattern 88A1. The partial pattern 88A2 projects out in the +X direction. One end of the partial pattern 88A3 is connected to the partial pattern 88A1. The partial pattern 88A3 projects out in the +Y direction.

The coupling capacitance electrode 88B includes partial patterns (electrode patterns) 88B1 to 88B3. The partial pattern 88B1 is connected to the via electrode portion 20E. One end of the partial pattern 88B2 is connected to the partial pattern 88B1. The partial pattern 88B2 projects out in the −X direction. One end of the partial pattern 88B3 is connected to the partial pattern 88B1. The partial pattern 88B3 projects out in the −Y direction.

The coupling capacitance electrode 88C includes partial patterns (electrode patterns) 88C1 to 88C3. The partial pattern 88C1 is connected to the via electrode portion 20B. One end of the partial pattern 88C2 is connected to the partial pattern 88C1. The partial pattern 88C2 projects out in the −Y direction. One end of the partial pattern 88C3 is connected to the partial pattern 88C1. The partial pattern 88C3 projects out in the +X direction.

The coupling capacitance electrode 88D includes partial patterns (electrode patterns) 88D1 to 88D3. The partial pattern 88D1 is connected to the via electrode portion 20D. One end of the partial pattern 88D2 is connected to the partial pattern 88D1. The partial pattern 88D2 projects out in the +Y direction. One end of the partial pattern 88D3 is connected to the partial pattern 88D1. The partial pattern 88D3 projects out in the −X direction.

The coupling capacitance electrode 88E includes partial patterns (electrode patterns) 88E1 to 88E7. The partial pattern 88E1 is positioned at the center C of the dielectric substrate 14 as viewed in plan. One end of the partial pattern 88E1 is connected to the partial pattern 88E2. The partial pattern 88E2 is connected to the partial electrode portion 20Ca. The partial patterns 88E3 and 88E4 are connected to the partial pattern 88E2. The partial pattern 88E3 projects out in the −X direction. The partial pattern 88E4 projects out in the +X direction. The other end of the partial pattern 88E1 is connected to the partial pattern 88E5. The partial pattern 88E5 is connected to the partial electrode portion 20Cb. The partial patterns 88E6 and 88E7 are connected to the partial pattern 88E5. The partial pattern 88E6 projects out in the +X direction. The partial pattern 88E7 projects out in the −X direction.

As shown in FIG. 23 and FIG. 26, coupling capacitance electrodes (plate electrodes) 90A to 90E are formed within the dielectric substrate 14. The coupling capacitance electrode 90A is connected to the via electrode portion 20A provided in the resonator 11A. The coupling capacitance electrode 90B is connected to the via electrode portion 20E provided in the resonator 11E. The coupling capacitance electrode 90C is connected to the via electrode portion 20B provided in the resonator 11B. The coupling capacitance electrode 90D is connected to the via electrode portion 20D provided in the resonator 11D. The coupling capacitance electrode 90E is connected to the via electrode portion 20C provided in the resonator 11C. The coupling capacitance electrodes 90A to 90E are formed in the same layer. Stated otherwise, the coupling capacitance electrodes 90A to 90E are formed on the same ceramic sheet. When the individual coupling capacitance electrodes are described without distinguishing therebetween, the reference numeral 90 will be used, and when the individual coupling capacitance electrodes are described while distinguishing therebetween, the reference numerals 90A to 90E will be used. One or more non-illustrated ceramic sheets exist between the coupling capacitance electrodes 90 and the coupling capacitance electrodes 88.

The coupling capacitance electrodes 90 are formed in point symmetry, with the center C of the dielectric substrate 14 as viewed in plan serving as the center of symmetry. The coupling capacitance electrode 90A and the coupling capacitance electrode 90B are formed in point symmetry, with the center C of the dielectric substrate 14 as viewed in plan serving as the center of symmetry. Specifically, the coupling capacitance electrode 90C and the coupling capacitance electrode 90D are formed in point symmetry, with the center C of the dielectric substrate 14 as viewed in plan serving as the center of symmetry. The coupling capacitance electrode 90E is formed in point symmetry, with the center C of the dielectric substrate 14 as viewed in plan serving as the center of symmetry. In the present embodiment, the feature in which the coupling capacitance electrodes 90 are formed in point symmetry is in order to obtain satisfactory frequency characteristics.

As shown in FIG. 26, the coupling capacitance electrode 90A includes partial patterns (electrode patterns) 90A1 to 90A3. The partial pattern 90A1 is connected to the via electrode portion 20A. One end of the partial pattern 90A2 is connected to the partial pattern 90A1. The partial pattern 90A2 projects out in the +X direction. One end of the partial pattern 90A3 is connected to the partial pattern 90A1. The partial pattern 90A3 projects out in the +Y direction.

The coupling capacitance electrode 90B includes partial patterns (electrode patterns) 90B1 to 90B3. The partial pattern 90B1 is connected to the via electrode portion 20E. One end of the partial pattern 90B2 is connected to the partial pattern 90B1. The partial pattern 90B2 projects out in the −X direction. One end of the partial pattern 90B3 is connected to the partial pattern 90B1. The partial pattern 90B3 projects out in the −Y direction.

The coupling capacitance electrode 90C includes partial patterns (electrode patterns) 90C1 to 90C3. The partial pattern 90C1 is connected to the via electrode portion 20B. One end of the partial pattern 90C2 is connected to the partial pattern 90C1. The partial pattern 90C2 projects out in the −Y direction. One end of the partial pattern 90C3 is connected to the partial pattern 90C1. The partial pattern 90C3 projects out in the +X direction.

The coupling capacitance electrode 90D includes partial patterns (electrode patterns) 90D1 to 90D3. The partial pattern 90D1 is connected to the via electrode portion 20D. One end of the partial pattern 90D2 is connected to the partial pattern 90D1. The partial pattern 90D2 projects out in the +Y direction. One end of the partial pattern 90D3 is connected to the partial pattern 90D1. The partial pattern 90D3 projects out in the −X direction.

The coupling capacitance electrode 90E includes partial patterns (electrode patterns) 90E1 to 90E7. The partial pattern 90E1 is positioned at the center C of the dielectric substrate 14 as viewed in plan. The partial patterns 90E2 and 90E3 are connected to the partial pattern 90E1. The partial pattern 90E2 projects out in the −X direction. The partial pattern 90E3 projects out in the +X direction. The partial pattern 90E4 is connected to the partial patterns 90E2 and 90E3. The partial pattern 90E4 projects out in the −Y direction. The partial pattern 90E4 is connected to the partial electrode portion 20Ca. The partial patterns 90E5 and 90E6 are connected to the partial pattern 90E1. The partial pattern 90E5 projects out in the +X direction. The partial pattern 90E6 projects out in the −X direction. The partial pattern 90E7 is connected to the partial patterns 90E5 and 90E6. The partial pattern 90E7 projects out in the +Y direction. The partial pattern 90E7 is connected to the partial electrode portion 20Cb.

A portion of the coupling capacitance electrodes 86, a portion of the coupling capacitance electrodes 88, and a portion of the coupling capacitance electrodes 90 overlap with each other as viewed in plan. Consequently, the plurality of capacitive coupling structures 71 (refer to FIG. 23) are formed.

The distance d1 in the Z direction between the capacitor electrode 18 and the capacitive coupling structures 71 (refer to FIG. 19A) can be set to be less than or equal to two times the distance d2 in the Z direction between the shielding conductor 12A and the capacitor electrode 18 (see FIG. 19A). More preferably, the distance d1 can be set to be less than or equal to 1.5 times the distance d2. In the present embodiment, the distance d1 is set, for example, to 0.12 mm. Further, in the present embodiment, the distance d2 is set, for example, to 0.12 mm. In the present embodiment, the distance d1 is set to be one times the distance d2.

As shown in FIG. 27 and FIG. 28, coupling capacitance electrodes (plate electrodes) 92A to 92E are formed within the dielectric substrate 14. The coupling capacitance electrode 92A is connected to the via electrode portion 20A provided in the resonator 11A. The coupling capacitance electrode 92B is connected to the via electrode portion 20E provided in the resonator 11E. The coupling capacitance electrode 92C is connected to the via electrode portion 20B provided in the resonator 11B. The coupling capacitance electrode 92D is connected to the via electrode portion 20D provided in the resonator 11D. The coupling capacitance electrode 92E is connected to the via electrode portion 20C provided in the resonator 11C. The coupling capacitance electrodes 92A to 92E are formed in the same layer. Stated otherwise, the coupling capacitance electrodes 92A to 92E are formed on the same ceramic sheet (not shown). When the individual coupling capacitance electrodes are described without distinguishing therebetween, the reference numeral 92 will be used, and when the individual coupling capacitance electrodes are described while distinguishing therebetween, the reference numerals 92A to 92E will be used. One or more non-illustrated ceramic sheets exist between the coupling capacitance electrodes 92 and the coupling capacitance electrodes 90.

The coupling capacitance electrodes 92 are formed in point symmetry, with the center C of the dielectric substrate 14 as viewed in plan serving as the center of symmetry. The coupling capacitance electrode 92A and the coupling capacitance electrode 92B are formed in point symmetry, with the center C of the dielectric substrate 14 as viewed in plan serving as the center of symmetry. The coupling capacitance electrode 92C and the coupling capacitance electrode 92D are formed in point symmetry, with the center C of the dielectric substrate 14 as viewed in plan serving as the center of symmetry. The coupling capacitance electrode 92E is formed in point symmetry, with the center C of the dielectric substrate 14 as viewed in plan serving as the center of symmetry. In the present embodiment, the feature in which the coupling capacitance electrodes 92 are formed in point symmetry is in order to obtain satisfactory frequency characteristics.

As shown in FIG. 29 and FIG. 30, coupling capacitance electrodes (plate electrodes) 94A and 94B are formed within the dielectric substrate 14. The coupling capacitance electrode 94A is connected to the via electrode portion 20A provided in the resonator 11A. The coupling capacitance electrode 94B is connected to the via electrode portion 20E provided in the resonator 11E. The coupling capacitance electrodes 94A and 94B are formed in the same layer. Stated otherwise, the coupling capacitance electrodes 94A and 94B are formed on the same ceramic sheet (not shown). When the individual coupling capacitance electrodes are described without distinguishing therebetween, the reference numeral 94 will be used, and when the individual coupling capacitance electrodes are described while distinguishing therebetween, the reference numerals 94A and 94B will be used. One or more non-illustrated ceramic sheets exist between the coupling capacitance electrodes 94 and the coupling capacitance electrodes 92.

The coupling capacitance electrodes 94 are formed in point symmetry, with the center C of the dielectric substrate 14 as viewed in plan serving as the center of symmetry. The coupling capacitance electrode 94A and the coupling capacitance electrode 94B are formed in point symmetry, with the center C of the dielectric substrate 14 as viewed in plan serving as the center of symmetry. In the present embodiment, the feature in which the coupling capacitance electrodes 94 are formed in point symmetry is in order to obtain satisfactory frequency characteristics.

As shown in FIG. 31 and FIG. 32, a coupling pattern 96 is formed within the dielectric substrate 14. The coupling pattern 96 is connected to the via electrode portion 20B that is provided in the resonator 11B, and the via electrode portion 20D that is provided in the resonator 11D. One or more non-illustrated ceramic sheets exist between the coupling pattern 96 and the coupling capacitance electrodes 94.

The coupling pattern 96 is formed in point symmetry, with the center C of the dielectric substrate 14 as viewed in plan serving as the center of symmetry. In the present embodiment, the feature in which the coupling pattern 96 is formed in point symmetry is in order to obtain satisfactory frequency characteristics.

The coupling pattern 96 is formed in the same layer as the input/output patterns 80A and 80B. Stated otherwise, the coupling pattern 96 and the input/output patterns 80A and 80B are formed on the same ceramic sheet (not shown). One or more non-illustrated ceramic sheets exist between the coupling pattern 96 and the coupling capacitance electrodes 94.

In this manner, according to the present embodiment, the distance d1 in the Z direction between the capacitor electrodes 18 and the capacitive coupling structures 71 is set to be sufficiently small. Therefore, according to the present embodiment, it is possible to achieve a reduction in height while suppressing a deterioration of the Q-factor. Therefore, according to the present invention, it is possible to obtain the filter 10 that can achieve a reduction in height while suppressing deterioration of the filter characteristics.

The present invention is not necessarily limited to the above-described embodiments, and various configurations can be adopted therein without departing from the essence and gist of the present invention.

A description will be given below concerning the inventions that are capable of being grasped from the above-described embodiment.

The filter (10) includes the dielectric substrate (14), the first shielding conductor (12A) formed in the vicinity of the first main surface (14*b*) of the dielectric substrate, the second shielding conductor (12B) formed in the vicinity of the second main surface (14*a*) of the dielectric substrate, the plurality of resonators (11A to 11E) each including the via electrode portion (20A to 20E) formed inside the dielectric substrate and the capacitor electrode (19A, 18B, 19C, 18D, 19E) facing toward the first shielding conductor and connected to one end of the via electrode portion, and the first capacitive coupling structure (71AB) including the first electrode pattern (19A3) connected to the first capacitor electrode (19A) which is the capacitor electrode provided in the first resonator (11A) from among the plurality of resonators, and the second electrode pattern (18B2) connected to the second capacitor electrode (18B) which is the capacitor electrode provided in the second resonator (11B) from among the plurality of resonators, at least a portion of the second electrode pattern overlapping with at least a portion of the first electrode pattern as viewed in plan.

In the above-described filter, there may further be provided the second capacitive coupling structure (71BC) including the third electrode pattern (18B3) connected to the second capacitor electrode, and the fourth electrode pattern (19C2) connected to the third capacitor electrode (19C) which is the capacitor electrode provided in the third resonator (11C) from among the plurality of resonators, at least a portion of the fourth electrode pattern overlapping with at least a portion of the third electrode pattern as viewed in plan.

In the above-described filter, the second capacitive coupling structure may further include the fifth electrode pattern (72A2) connected to the second via electrode portion (20B) which is the via electrode portion provided in the second resonator, at least a portion of the fifth electrode pattern overlapping with at least a portion of the fourth electrode pattern as viewed in plan.

In the above-described filter, there may further be provided the third capacitive coupling structure (71AC) including the sixth electrode pattern (19A2) connected to the first capacitor electrode and the seventh electrode pattern (72C2) connected to the third via electrode portion (20C) which is the via electrode portion provided in the third resonator, at least a portion of the seventh electrode pattern overlapping with at least a portion of the sixth electrode pattern as viewed in plan.

The filter includes the dielectric substrate, the first shielding conductor formed in the vicinity of the first main surface of the dielectric substrate, the second shielding conductor formed in the vicinity of the second main surface of the dielectric substrate, the plurality of resonators each including the via electrode portion formed inside the dielectric substrate and the capacitor electrode (18A to 18E) facing toward the first shielding conductor and connected to one end of the via electrode portion, and the capacitive coupling structure (71) including the first electrode pattern (86A3) connected to the first via electrode portion (20A) which is the via electrode portion provided in the first resonator from among the plurality of resonators, and the second electrode pattern (88C2) connected to the second via electrode portion (20B) which is the via electrode portion provided in the second resonator (11B) from among the plurality of resonators, at least a portion of the second electrode pattern overlapping at least a portion of the first electrode pattern as viewed in plan, wherein the longitudinal direction of the via electrode portion is aligned along the first direction (Z) that is a normal direction of the first shielding conductor, the position of the capacitor electrode in the first direction is between the position of the first shielding conductor in the first direction and the position of the capacitive coupling structure in the first direction, and the first distance (d1), which is the distance between the capacitor electrode and the capacitive coupling structure in the first direction, is less than or equal to twice the second distance (d2), which is the distance between the first shielding conductor and the capacitor electrode in the first direction. In accordance with such a configuration, it is possible to achieve a reduction in height while suppressing a deterioration of the Q-factor. In accordance with such a configuration, it is possible to provide a filter that can achieve a reduction in height while suppressing deterioration of the filter characteristics.

In the above-described filter, the first distance may be less than or equal to 1.5 times the second distance.

The invention claimed is:

1. A filter comprising:

a dielectric substrate;

a first shielding conductor formed in vicinity of a first main surface of the dielectric substrate;

a second shielding conductor formed in vicinity of a second main surface of the dielectric substrate;

a plurality of resonators each including a via electrode portion formed inside the dielectric substrate and a capacitor electrode facing toward the first shielding conductor and connected to one end of the via electrode portion; and a first capacitive coupling structure including a first electrode pattern connected to a first capacitor electrode which is the capacitor electrode provided in a first resonator from among the plurality of resonators, and a second electrode pattern connected to a second capacitor electrode which is the capacitor electrode provided in a second resonator from among the plurality of resonators, at least a portion of the second electrode pattern overlapping with at least a portion of the first electrode pattern as viewed in plan;

wherein the first electrode pattern and the first capacitor electrode are formed integrally, and the second electrode pattern and the second capacitor electrode are formed integrally.

2. The filter according to claim 1, further comprising a second capacitive coupling structure including a third electrode pattern connected to the second capacitor electrode, and a fourth electrode pattern connected to a third capacitor electrode which is the capacitor electrode provided in a third resonator from among the plurality of resonators, at least a portion of the fourth electrode pattern overlapping with at least a portion of the third electrode pattern as viewed in plan.

3. The filter according to claim 2, wherein the second capacitive coupling structure further includes a fifth electrode pattern connected to a second via electrode portion which is the via electrode portion provided in the second resonator, at least a portion of the fifth electrode pattern overlapping with at least a portion of the fourth electrode pattern as viewed in plan.

4. A filter comprising:

a dielectric substrate;

a first shielding conductor formed in vicinity of a first main surface of the dielectric substrate;

a second shielding conductor formed in vicinity of a second main surface of the dielectric substrate;

a plurality of resonators each including a via electrode portion formed inside the dielectric substrate and a capacitor electrode facing toward the first shielding conductor and connected to one end of the via electrode portion;

a first capacitive coupling structure including a first electrode pattern connected to a first capacitor electrode which is the capacitor electrode provided in a first resonator from among the plurality of resonators, and a second electrode pattern connected to a second capacitor electrode which is the capacitor electrode provided in a second resonator from among the plurality of resonators, at least a portion of the second electrode pattern overlapping with at least a portion of the first electrode pattern as viewed in plan;

a second capacitive coupling structure including a third electrode pattern connected to the second capacitor electrode, and a fourth electrode pattern connected to a third capacitor electrode which is the capacitor electrode provided in a third resonator from among the plurality of resonators, at least a portion of the fourth electrode pattern overlapping with at least a portion of the third electrode pattern as viewed in plan; and a third capacitive coupling structure including a sixth electrode pattern connected to the first capacitor electrode and a seventh electrode pattern connected to a third via electrode portion which is the via electrode portion provided in the third resonator, at least a portion of the seventh electrode pattern overlapping with at least a portion of the sixth electrode pattern as viewed in plan.

5. A filter comprising:

a dielectric substrate;

a first shielding conductor formed in vicinity of a first main surface of the dielectric substrate;

a second shielding conductor formed in vicinity of a second main surface of the dielectric substrate;

a plurality of resonators each including a via electrode portion formed inside the dielectric substrate and a capacitor electrode facing toward the first shielding conductor and connected to one end of the via electrode portion; and a capacitive coupling structure including a first electrode pattern connected to a first via electrode portion which is the via electrode portion provided in a first resonator from among the plurality of resonators, and a second electrode pattern connected to a second via electrode portion which is the via electrode portion provided in a second resonator from among the plurality of resonators, at least a portion of the second electrode pattern overlapping at least a portion of the first electrode pattern as viewed in plan, wherein a longitudinal direction of the via electrode portion is aligned along a first direction that is a normal direction of the first shielding conductor, a position of the capacitor electrode in the first direction is between a position of the first shielding conductor in the first direction and a position of the capacitive coupling structure in the first direction, and a first distance, which is a distance between the capacitor electrode and the capacitive coupling structure in the first direction, is less than or equal to twice a second distance, which is a distance between the first shielding conductor and the capacitor electrode in the first direction.

6. The filter according to claim 5, wherein the first distance is less than or equal to 1.5 times the second distance.

* * * * *